US012589510B2

(12) United States Patent　　(10) Patent No.: US 12,589,510 B2
Isobe et al.　　　　　　　　　　　(45) Date of Patent: Mar. 31, 2026

(54) WORK DEVICE

(71) Applicant: NTN CORPORATION, Osaka (JP)

(72) Inventors: Hiroshi Isobe, Iwata (JP); Jun Midoumae, Iwata (JP); Masaki Kagami, Iwata (JP)

(73) Assignee: NTN CORPORATION, Osaka (JP)

( * ) Notice: Subject to any disclaimer, the term of this patent is extended or adjusted under 35 U.S.C. 154(b) by 243 days.

(21) Appl. No.: 18/198,365

(22) Filed: May 17, 2023

(65) Prior Publication Data

US 2023/0286178 A1　　Sep. 14, 2023

Related U.S. Application Data

(63) Continuation of application No. PCT/JP2021/041293, filed on Nov. 10, 2021.

(30) Foreign Application Priority Data

Nov. 20, 2020　　(JP) ................................. 2020-193449

(51) Int. Cl.
　　B25J 17/02　　　　(2006.01)
　　F16H 37/12　　　　(2006.01)
　　G01N 21/88　　　　(2006.01)
(52) U.S. Cl.
　　CPC .......... B25J 17/0283 (2013.01); F16H 37/12 (2013.01); G01N 21/88 (2013.01)
(58) Field of Classification Search
　　CPC ........ B25J 17/00; B25J 17/02; B25J 17/0283;

B25J 9/00; B25J 9/0009; B25J 9/0084; B25J 9/009; B25J 9/04; F16H 21/00; F16H 21/02; F16H 21/12; F16H 21/46; F16H 21/48; F16H 21/50; F16H 37/12; F16H 37/122; G01N 21/84; G01N 21/88; G01N 21/8803; G01N 21/8806
See application file for complete search history.

(56) References Cited

U.S. PATENT DOCUMENTS 4,723,460 A * 2/1988 Rosheim .............. B25J 17/0283
　　　　　　　　　　　　　　　　　　901/29
4,819,496 A * 4/1989 Shelef .................. B25J 17/0216
　　　　　　　　　　　　　　　　　　901/29

(Continued)

FOREIGN PATENT DOCUMENTS

CN　　　110480671 A　　11/2019
JP　　　2000-94245　　　4/2000
　　　　　　　(Continued)

*Primary Examiner* — John R Lee

(57)　　　ABSTRACT

An operation device including a combination of a rotation unit and a linear motion unit. The rotation unit includes a link actuation apparatus and a rotation actuator. The link actuation apparatus includes a proximal end side-link hub, and a distal end side-link hub coupled thereto through three or more link mechanisms so as to enable a varying attitude relative thereto. The link actuation apparatus is mounted to an output shaft of the rotation actuator such that a central axis of the proximal end side-link hub forms an angle relative to an axis of rotation of the rotation actuator. The linear motion unit includes a linear actuator serving as an output portion thereof, and the rotation unit is mounted to this linear actuator.

11 Claims, 20 Drawing Sheets

(56) References Cited

U.S. PATENT DOCUMENTS

| | | | | |
|---|---|---|---|---|
| 4,832,563 A * | 5/1989 | Massmann | | B25J 9/042 |
| | | | | 901/17 |
| 5,556,242 A * | 9/1996 | Sheldon | | B23Q 1/5462 |
| | | | | 409/211 |
| 5,656,905 A * | 8/1997 | Tsai | | B25J 17/0266 |
| | | | | 901/41 |
| 5,715,729 A * | 2/1998 | Toyama | | B23Q 1/5462 |
| | | | | 901/29 |
| 5,893,296 A | 4/1999 | Rosheim | | |
| 9,248,572 B2 * | 2/2016 | Ide | | B25J 9/163 |
| 9,746,037 B2 * | 8/2017 | Sone | | F16H 21/54 |
| 10,406,677 B2 * | 9/2019 | Isobe | | F16H 21/46 |
| 10,890,236 B2 * | 1/2021 | Sakata | | B25J 9/106 |
| 11,130,225 B2 * | 9/2021 | Isobe | | B25J 9/0048 |
| 11,154,994 B2 | 10/2021 | Isobe et al. | | |
| 11,420,322 B2 * | 8/2022 | Nose | | B25J 9/026 |
| 12,042,935 B2 * | 7/2024 | Nose | | B25J 9/1674 |
| 2005/0159075 A1 * | 7/2005 | Isobe | | B25J 9/0048 |
| | | | | 446/104 |
| 2005/0199085 A1 * | 9/2005 | Isobe | | B25J 9/0048 |
| | | | | 74/490.05 |
| 2006/0213048 A1 * | 9/2006 | Kalanovic | | B23Q 1/5412 |
| | | | | 29/559 |
| 2008/0028881 A1 * | 2/2008 | Sone | | G05G 25/02 |
| | | | | 74/471 R |
| 2012/0043100 A1 * | 2/2012 | Isobe | | B25J 9/0048 |
| | | | | 901/41 |
| 2012/0053701 A1 * | 3/2012 | Yi | | B25J 13/04 |
| | | | | 700/3 |
| 2013/0055843 A1 * | 3/2013 | Isobe | | F16C 1/02 |
| | | | | 901/15 |
| 2014/0223722 A1 * | 8/2014 | Isobe | | B23P 19/04 |
| | | | | 29/700 |
| 2014/0227023 A1 * | 8/2014 | Sone | | F16M 11/18 |
| | | | | 403/180 |
| 2014/0248965 A1 * | 9/2014 | Isobe | | F16C 19/46 |
| | | | | 464/112 |
| 2014/0331806 A1 * | 11/2014 | Nagatsuka | | B25J 18/00 |
| | | | | 901/19 |
| 2015/0088308 A1 * | 3/2015 | Isobe | | B25J 9/12 |
| | | | | 700/245 |
| 2015/0120059 A1 * | 4/2015 | Ide | | B25J 9/163 |
| | | | | 901/14 |
| 2016/0008977 A1 * | 1/2016 | Nishio | | B25J 9/06 |
| | | | | 700/262 |
| 2016/0059426 A1 * | 3/2016 | Sone | | B25J 17/00 |
| | | | | 74/490.05 |
| 2017/0014994 A1 * | 1/2017 | Isobe | | B25J 9/08 |
| 2017/0205022 A1 * | 7/2017 | Trui | | G01B 5/004 |
| 2017/0268640 A1 * | 9/2017 | Sakata | | G06F 3/0321 |
| 2018/0194002 A1 * | 7/2018 | Isobe | | B25J 9/0018 |
| 2018/0207810 A1 * | 7/2018 | Konagai | | F16H 21/46 |
| 2018/0236619 A1 * | 8/2018 | Nose | | B23Q 1/25 |
| 2018/0290294 A1 * | 10/2018 | Nose | | B25J 9/102 |
| 2019/0047159 A1 * | 2/2019 | Isobe | | B25J 9/0087 |
| 2019/0099878 A1 * | 4/2019 | Marui | | F16H 21/46 |
| 2019/0105769 A1 * | 4/2019 | Nose | | B25J 17/0216 |
| 2019/0111561 A1 * | 4/2019 | Isobe | | B25J 19/06 |
| 2019/0152046 A1 * | 5/2019 | Konagai | | B25J 5/04 |
| 2019/0255699 A1 * | 8/2019 | Isobe | | B25J 17/0283 |
| 2019/0255700 A1 * | 8/2019 | Nose | | B25J 9/0087 |
| 2019/0366535 A1 * | 12/2019 | Sakata | | B25J 9/1664 |
| 2020/0206897 A1 * | 7/2020 | Isobe | | B25J 9/0048 |
| 2020/0298425 A1 * | 9/2020 | Au | | B25J 18/02 |
| 2020/0376687 A1 * | 12/2020 | Noh | | H02K 9/18 |
| 2023/0286178 A1 * | 9/2023 | Isobe | | B25J 5/04 |
| 2025/0010467 A1 * | 1/2025 | Shimura | | B23Q 15/12 |

FOREIGN PATENT DOCUMENTS

| | | |
|---|---|---|
| JP | 2013-64644 | 4/2013 |
| JP | 2017-26441 | 2/2017 |
| JP | 2017-193009 | 10/2017 |
| JP | 2018-167350 | 11/2018 |
| JP | 2018-194443 | 12/2018 |
| JP | 2019-49311 | 3/2019 |
| JP | 2019-198960 | 11/2019 |

* cited by examiner

WORK DEVICE

CROSS REFERENCE TO THE RELATED APPLICATION

This application is a continuation application, under 35 U.S.C. § 111(a) of international patent application No. PCT/JP2021/041293, filed Nov. 10, 2021, which claims priority to Japanese patent application No. 2020-193449, filed Nov. 20, 2020, the entire disclosures of all of which are herein incorporated by reference as a part of this application.

BACKGROUND OF THE INVENTION

Field of the Invention

The present invention relates, for example, to a work device or an operation device used in conjunction with a device such as a medical device or an industrial device, by means of which a high speed, highly precise, and intricate operation with an extensively large zone of operation is desired.

Description of Related Art

Patent Document 1 discloses an operation device which performs a prescribed operation by using a parallel link mechanism including a base plate and a travelling plate that are coupled with a plurality of link mechanism therebetween and by actuating these links cooperatively so as to move the travelling plate.

Patent Document 2 discloses a link actuation apparatus which is compact, yet capable of a high speed and highly precise operation with an extensively large zone of operation.

Patent Document 3 discloses an operation device combining a linear motion unit with a rotation unit in the form of a pan/tilt mechanism.

Patent Document 4 discloses an operation device using a typical, vertical articulated robot.

Patent Document 5 discloses an operation device (or appearance inspection device) combining a link actuation apparatus with a linear motion unit is proposed.

RELATED DOCUMENT

Patent Document

[Patent Document 1] JP Laid-open Patent Publication No. 2000-094245
[Patent Document 2] U.S. Pat. No. 5,893,296
[Patent Document 3] JP Laid-open Patent Publication No. 2013-064644
[Patent Document 4] JP Laid-open Patent Publication No. 2017-026441
[Patent Document 5] JP Laid-open Patent Publication No. 2018-194443

The angle of actuation for each of the links of the parallel link mechanism in Patent Document 1 is so limited that the lengths of the links should be extended if one wishes to configure the travelling plate to have a larger zone of operation. Thus, the resulting increase of the dimensions of the link mechanism as a whole gave rise to a problem of expanded size of the device. Also, another problem was the poor rigidity of the link mechanism as a whole; thus, a tool that can be installed on the travelling plate—therefore, the weight that can be carried by the travelling plate—is also limited to one having a low weight.

The link actuation apparatus in Patent Document 2 achieved a greater range of movement, in a direction of rotation, than the parallel link mechanism in Patent Document 1. However, it was difficult to implement a complicated operation by use of this link actuation apparatus alone, as it was incapable of making a movement in directions along a plane.

Patent Documents 3 and 4 disclose operation devices for positioning a camera and a workpiece at a variety of angles. However, a rotation mechanism disclosed in Patent Document 3 has a configuration analogous to that of a wrist joint of a standard vertical articulated robot, and therefore, has the problem that, even if one wishes to vary the attitude of a tip end by just a little, the speed of the operation will be rather slow, due to a substantial movement made by a particular rotary mechanism. More specifically, when a turning motion is desired, a turning shaft (corresponding to a first rotary shaft 131 in Patent Document 3) will have to make a large movement, in comparison to the angle of movement of the tip end. A vertical articulated robot disclosed in Patent Document 4 faces the same problem as that of Patent Document 3 when one wishes to vary the attitude of a tip end by just a little, and also has the problem that the robot itself makes, overall, a substantial amount of movements, which, upon the provision of a fence, result in an increase of the overall size of the device.

As an attempt to solve such problems, Patent Document 5 suggested an operation device that combined a link actuation apparatus with a linear motion unit. While the design in Patent Document 5 allows a compact operation device to be implemented, a workpiece can only be approached in directions of a half-sphere side of the workpiece (e.g., directions of a north hemisphere side of the workpiece). For this reason, the workpiece had to be flipped, for example, when one wished to perform the operation in directions from below the workpiece.

SUMMARY OF THE INVENTION

An object of the present invention is to provide an operation device which ensures a large zone of operation for a workpiece, allows a high speed, highly precise, and intricate operation, like an operation by hand, to be implemented, and can shorten a changeover process.

An operation device according to the present invention includes a combination of a rotation unit and a linear motion unit. The rotation unit includes a link actuation apparatus and a rotation actuator. The link actuation apparatus includes: a proximal end side-link hub; a distal end side-link hub; and three or more link mechanisms which coupled the distal end side-link hub to the proximal end side-link hub so as to enable a varying attitude of the distal end side-link hub relative to the proximal end side-link hub. Each of the link mechanisms includes: a proximal end side-end link member having one end pivotally coupled to the proximal end side-link hub; a distal end side-end link member having one end pivotally coupled to the distal end side-link hub; and an intermediate link member having opposite ends pivotally coupled to the other ends of these proximal end side- and distal end side-, end link members. At least two of the three or more link mechanisms are associated with attitude control actuators configured to vary the attitude of the distal end side-link hub such that the distal end side-link hub assumes a given attitude relative to the proximal end side-link hub. The link actuation apparatus is mounted to an output shaft of the rotation actuator such that a central axis of the proximal end side-link hub forms an angle θt relative to an axis of rotation of the rotation actuator. The linear motion unit includes a linear actuator serving as an output portion thereof, and the rotation unit is mounted to this linear actuator.

According to this configuration, the link actuation apparatus is disposed such that the central axis of the proximal end side-link hub and the axis of rotation of the rotation actuator form the angle θt therebetween. This can have the effect of offsetting the zone of operation of the link actuation apparatus. For instance, when a link actuation apparatus with a maximum bend angle of 90° is mounted in a directly downward orientation, the zone of operation of this link actuation apparatus for a workpiece can only cover the directions of a north hemisphere side of the workpiece. On the other hand, by positioning the central axis of the proximal end side-link hub and the axis of rotation of the rotation actuator so as to form the angle θt therebetween, an operation can also be performed in the directions of a south hemisphere side of the workpiece, though only from the orientation defining the angle θt.

Further, by using the rotation actuator to rotate the link actuation apparatus with the angle θt being maintained, the orientation defining the angle θt can be rotated in a turning direction. Thus, by rotating the rotation actuator by ±180° about the axis of rotation thereof, an operation for the workpiece can be performed in the directions of the south hemisphere side of the workpiece over an entire circumference. As a result, a zone of operation which is larger than hitherto can be ensured for a workpiece, and shortening of a changeover process can be achieved. Furthermore, the use of the link actuation apparatus allows a high speed, highly precise, and intricate operation, like an operation by hand, to be implemented.

Two or more of the attitude control actuators in the link actuation apparatus may be disposed such that rotary shafts for the attitude control actuators extend perpendicular to the central axis of the proximal end side-link hub. The rotary shafts for the two or more of the attitude control actuators may define an intersecting point on the central axis of the proximal end side-link hub forming the angle θt. For two of the two or more of the attitude control actuators, bisectors of the rotary shafts may meet a plane defined by the axis of rotation of the rotation actuator and the central axis of the proximal end side-link hub, and the bisectors may be situated on the side of an acute angle formed between the axis of rotation of the rotation actuator and the central axis of the proximal end side-link hub.

According to this configuration, the attitude control actuators of the link actuation apparatus are less likely to interfere with the rotation actuator than those of a link actuation apparatus with a different directional inclination, and the rotation actuator and the link actuation apparatus can be positioned so as to reduce a distance therebetween. As a result, a more compact design of the operation device as a whole can be achieved. Further, a smaller moment of inertia of the rotation actuator and a decrease in the weight of the rotation unit are achieved, thereby allowing for a high-speed operation of the operation device as a whole to be implemented.

The rotation actuator may include a rotation control actuator main component and a speed reducer configured to reduce the speed of rotation from this actuator main component, and a cable carrier (Cableveyor®) configured to guide at least cables extending from the attitude control actuators while protecting the same may be disposed around the rotation actuator so as to slide in a direction of rotation. According to this configuration where the rotation actuator includes a rotation control actuator main component and a speed reducer, the rotation actuator can achieve a compact dimension in a radial direction, as compared to that of a rotation actuator employing a rotary drive system with no speed reducer. Cables connecting to the attitude control actuators of the link actuation apparatus, etc. can be stored in a compact fashion by a cable carrier, by disposing the cable carrier in an unoccupied space around the rotation actuator so as to slide in a direction of rotation. This facilitates the routing of the cables and can also relieve concerns about a breakage in the cables, etc.

The linear motion unit may include a first linear actuator mounted to a frame, a second linear actuator, and a third linear actuator which is said linear actuator serving as the output portion of the linear motion unit, and the rotation unit may be mounted to this third linear actuator. According to this configuration, it enables an operation to be performed for a workpiece that is being or has been conveyed by a conveyor, etc., and can be installed, for example, as a single unit with no need to modify a conveyor line.

The linear motion unit may include: the first linear actuator including a first slid-upon component mounted to the frame and a first slider component configured to be driven to advance and retract along this first slid-upon component; the second linear actuator including a second slid-upon component coupled to the first slider component and a second slider component configured to be driven to advance and retract along this second slid-upon component; and the third linear actuator including a third slid-upon component coupled to the second slider component and a third slider component configured to be driven to advance and retract along this third slid-upon component. According to this configuration, in the linear motion unit, the second slid-upon component is coupled to the first slider component while the third slid-upon component is coupled to the second slider component. This enables the operation device to be easily installed to a pre-existing conveyor line. Accordingly, an enhanced flexibility can be achieved for the operation device.

The first and second linear actuators may be arranged such that directions of advance and retraction of the first and second slider components are perpendicular to each other, and the third linear actuator may be arranged such that a direction of advance and retraction of the third slider component is perpendicular to the directions of advance and retraction of the first and second slider components. By arranging the linear motion unit so as to provide a movement in directions along three perpendicular axes in this manner, an intuitive use of the operation device can be realized. Thus, not only is the usability of the operation device improved, but also the balance of the operation device becomes more stable, thereby allowing a high speed operation to be implemented.

The third linear actuator may be arranged such that a direction of advance and retraction of the third slider component is an upward or downward direction or vertical direction; the third slider component may be a guide of the linear actuator; and the third slid-upon component may be a slide table of the linear actuator. According to this configuration, possible interferences between a workpiece and the third slider component in the linear motion unit are more easily avoided, and a more compact size of the operation device as a whole can be achieved. With the configurations that have been discussed, a zone of operation for a workpiece can be expanded. This, among other things, could lead to the third slider component of the third linear actuator that serves as the output portion of the linear motion unit being at more risk of coming into contact with the workpiece. According to a configuration, like the instant configuration, where the third slider component in the form of a guide is displaced in a vertical direction, it is possible for the linear motion unit to displace the third slider component to an interference-free position in relation to the workpiece, while producing a high speed movement in various directions.

The rotation actuator may be arranged such that the axis of rotation thereof is parallel to a direction of advance and retraction of the third slider component. According to this configuration, an operation for a workpiece that is being or has been conveyed by a conveyor, etc. is facilitated. When an operation is to be performed on a workpiece that is being or has been conveyed by a conveyor, etc., the top surface and a lateral surface of the workpiece are mainly the ones to be operated upon. If one wishes to perform an operation for the bottom surface, etc. of the workpiece, then, the workpiece is often flipped over itself to accommodate this need. In the instant configuration, not only can an operation be conducted for the top surface and lateral surface of the workpiece, but the workpiece is also ready to be operated upon from the bottom surface side thereof, and the need for a changeover, etc. therefor can, in turn, be obviated.

The link actuation apparatus may have a maximum bend angle of no less than 90° between said central axis of the proximal end side-link hub and a central axis of the distal end side-link hub. According to this configuration, even when the angle $\theta t$ formed between the central axis of the proximal end side-link hub and the axis of rotation of the rotation actuator in the link actuation apparatus is small, a large zone of operation for a workpiece can be ensured.

The link actuation apparatus may be mounted such that the central axis of the proximal end side-link hub is perpendicular to the axis of rotation of the rotation actuator. By using and disposing a link actuation apparatus with a maximum bend angle of no less than 90° such that the central axis of its proximal end side-link hub is perpendicular to the axis of rotation of the rotation actuator, an operation can be carried out for the top surface as well as bottom surface of a workpiece in directions normal thereto, thereby allowing an operation to be performed on the entire surface of the workpiece.

This operation device may be an appearance inspection device with an imaging instrument installed to the link actuation apparatus. According to this configuration, an appearance inspection procedure that is hitherto performed through visual inspection from different directions by humans can be automated at a high speed and with a high precision. Further, when the link actuation apparatus permits a cabling, which connects to the imaging instrument including a camera and an illuminator, among other things, to pass through its internal spaces, the routing of the cabling can be simplified with less chance of the cabling being twisted even after repeated movements in a turning or twist direction, while also mitigating troubles such as a breakage.

Any combinations of at least two features disclosed in the claims and/or the specification and/or the drawings should also be construed as encompassed by the present invention. Especially, any combinations of two or more of the claims should also be construed as encompassed by the present invention.

BRIEF DESCRIPTION OF THE DRAWINGS

The present invention will be more clearly understood from the following description of preferred embodiments with reference to the accompanying drawings. However, the embodiments and the drawings are given merely for the purpose of illustration and explanation, and should not be used to delimit the scope of the present invention, which scope is to be delimited by the appended claims. In the accompanying drawings, alike numerals on parts denote alike or corresponding parts throughout the multiple figures, and:

7
DESCRIPTION OF EMBODIMENTS

First Embodiment

An operation device that combines a rotation unit with a linear motion unit will be described in connection with FIGS. 1 to 14.

<General Configuration of Operation Device>

Figure 1:
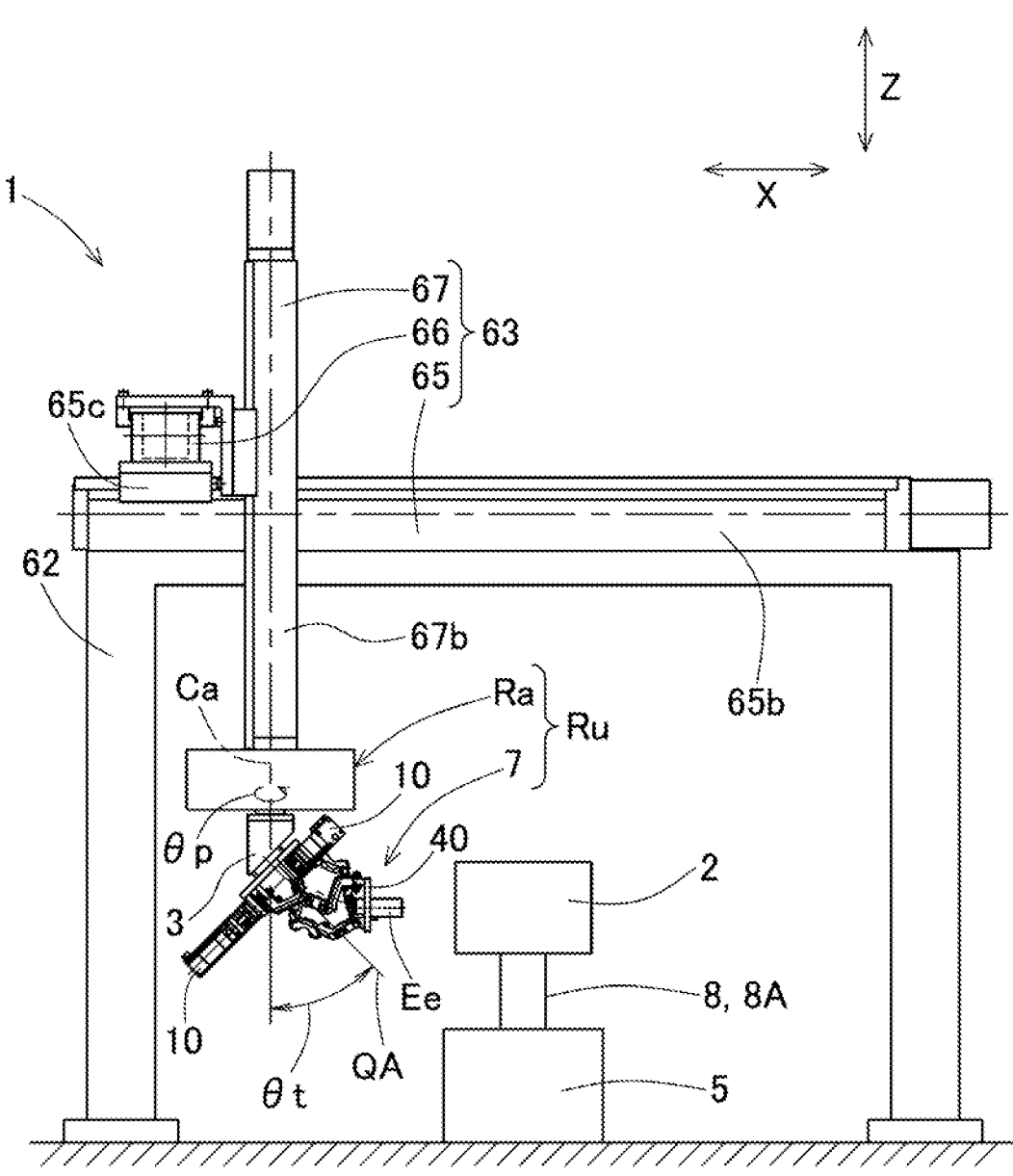
FIG. 1 shows a front elevational view of an operation device, in accordance with a first embodiment of the present invention.

As illustrated in FIG. 1, a linear motion unit 63 is installed on a frame 62 which is secured to a floor serving as a ground, and a rotation unit Ru is mounted to a guide (i.e., a third slider component) 67b of a third linear actuator 67 serving as an output portion of the linear motion unit 63. The rotation unit Ru includes a rotation actuator Ra and a link actuation apparatus 7. The rotation actuator Ra is arranged such that an axis Ca of rotation thereof is parallel to a direction of advance and retraction (i.e., an upward or downward direction or vertical direction in this example) of the guide 67b of the third linear actuator 67.

Figure 2:
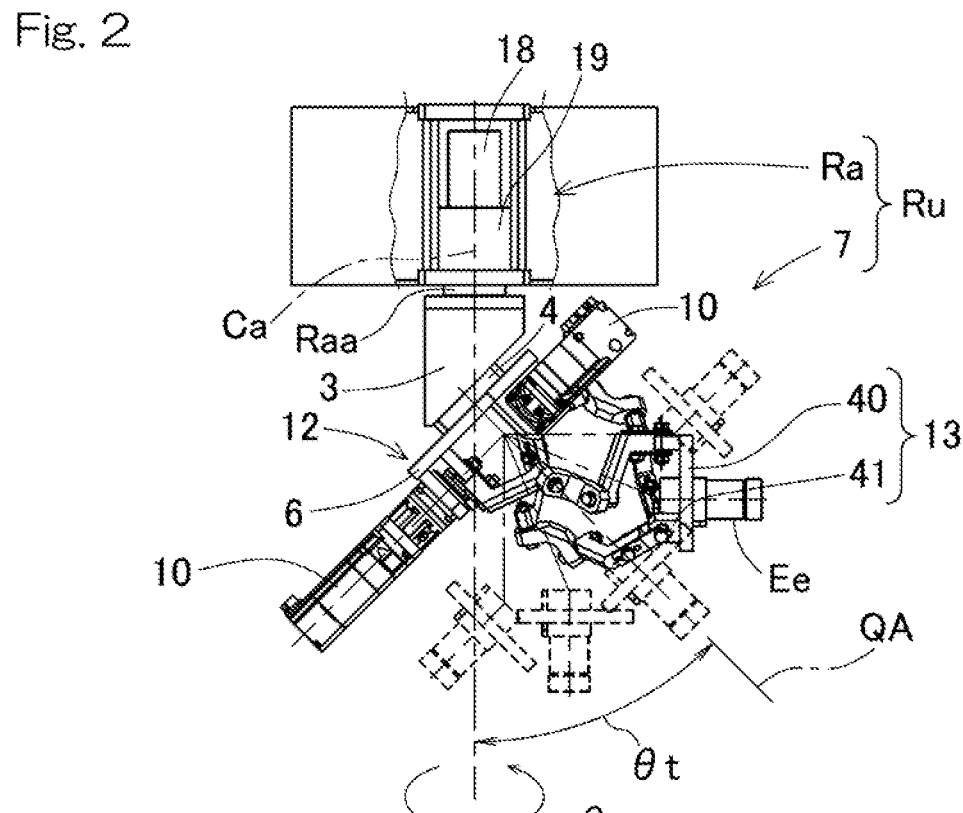
FIG. 2 shows a fragmentary enlarged view of a rotation unit of the operation device.

As illustrated in FIG. 2, this link actuation apparatus 7 is mounted to an output portion Raa of the rotation actuator Ra via a mounting member 3 and a spacer 4 in such a relation to the axis Ca of rotation of the rotation actuator Ra, that a central axis QA of a proximal end side-link hub 12 (which will be further discussed later) of the link actuation apparatus 7 and the axis Ca of rotation of the rotation actuator Ra form an angle θt therebetween. In the remainder of the discussion, the angle θt is referred to at times as a "mounting angle θt."

As illustrated in FIG. 1, a workpiece 2 which is to be operated upon is conveyed by a conveying machine 5 such as a conveyor while being placed on a workpiece mount table 8. As an alternative to the workpiece 2 being placed on the workpiece mount table 8, the workpiece 2 may instead be raised from the conveying machine 5 by a workpiece lifter device 8A at the time of an operation procedure. Also, as an alternative to the conveying machine 5 conveying the workpiece 2, an operator or some other robot may instead place the workpiece 2 on the workpiece mount table 8.

The operation device 1 performs an operation by positioning an end effector Ee, which is mounted to a distal end member 40 of the link actuation apparatus 7, relative to the workpiece 2. The rotation unit Ru and the linear motion unit 63 are, for example, connected to a common controller and are controlled in a synchronized manner by such a controller. Note that the rotation unit Ru and the linear motion unit 63 may instead be controlled in a non-synchronized manner.

<Re: Link Actuation Apparatus>

Figure 3:
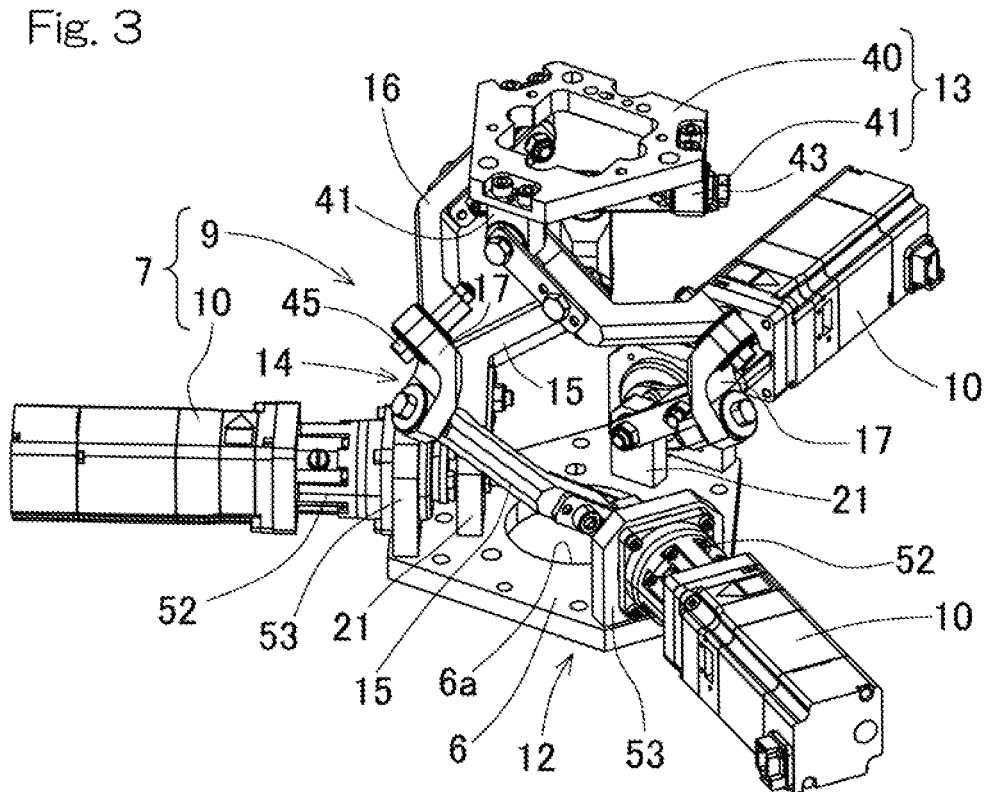
FIG. 3 shows a perspective view of a link actuation apparatus of the rotation unit.
Figure 4:
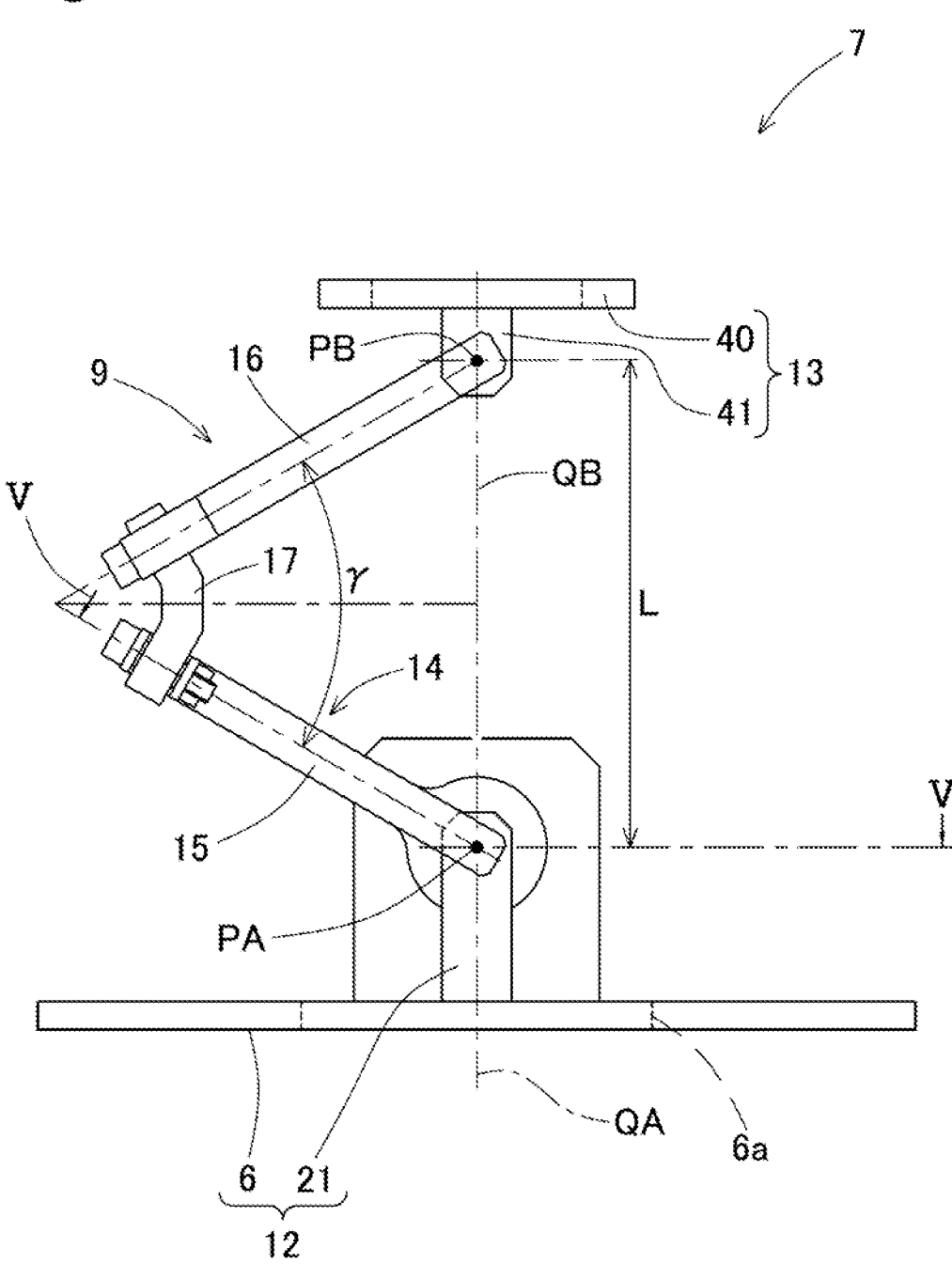
FIG. 4 shows a simplified model, as viewed from the front, generated by omitting two link mechanisms from the link actuation apparatus.

As illustrated in FIGS. 3 and 4, the link actuation apparatus 7 includes a parallel link mechanism 9 and attitude control actuators 10 that actuate this parallel link mechanism 9.

<Parallel Link Mechanism>

The parallel link mechanism 9 includes a proximal end side-link hub 12, and a distal end side-link hub 13 coupled to the proximal end side-link hub 12 through three or more link mechanisms 14 so as to enable a varying attitude of the distal end side-link hub 13 relative to the proximal end side-link hub 12. There may be four or more link mechanisms 14. Note that, in FIG. 4, only one link mechanism 14 is shown, with the other two link mechanisms having been omitted.

Each of the link mechanisms 14 includes a proximal end side-end link member 15, a distal end side-end link member 16, and an intermediate link member 17, which make up a four-link link mechanism with four revolute pairs. The proximal end side-end link member 15 is L-shaped and has one end pivotably coupled to the proximal end side-link hub 12. Similarly, the distal end side-end link member 16 is L-shaped and has one end pivotably coupled to the distal end side-link hub 13. The intermediate link member 17 has opposite ends pivotably coupled to the other ends of the proximal end side- and distal end side-, end link members 15, 16, respectively.

The parallel link mechanism 9 is of a design integrating two spherical link mechanisms together. The central axes of each revolute pair between the proximal end side-link hub 12 and the proximal end side-end link member 15 and of each revolute pair between the proximal end side-end link member 15 and the intermediate link member 17 intersect at a center PA of a proximal end side-spherical link mechanism. Likewise, the central axes of each revolute pair between the distal end side-link hub 13 and the distal end side-end link member 16 and of each revolute pair between the distal end side-end link member 16 and the intermediate link member 17 intersect at a center PB of a distal end side-spherical link mechanism.

Also, a distance between the center PA of the proximal end side-spherical link mechanism, on one hand, and the center of each revolute pair between the proximal end side-link hub 12 and the proximal end side-end link member 15, on the other hand, is identical. A distance between the center PA of the proximal end side-spherical link mechanism, on one hand, and the center of each revolute pair between the proximal end side-end link member 15 and the intermediate link member 17, on the other hand, is identical. Likewise, a distance between the center PB of the distal end side-spherical link mechanism, on one hand, and the center of each revolute pair between the distal end side-link hub 13 and the distal end side-end link member 16, on the other hand, is identical. A distance between the center PB of the distal end side-spherical link mechanism, on one hand, and the center of each revolute pair between the distal end side-end link member 16 and the intermediate link member 17, on the other hand, is identical. The central axis of each revolute pair between the intermediate link member 17 and the proximal end side-end link member 15 and the central axis of an associated revolute pair between the same intermediate link member 17 and the distal end side-end link member 16 may have a crossing angle γ therebetween, or may alternatively be parallel to each other.

Figure 5:
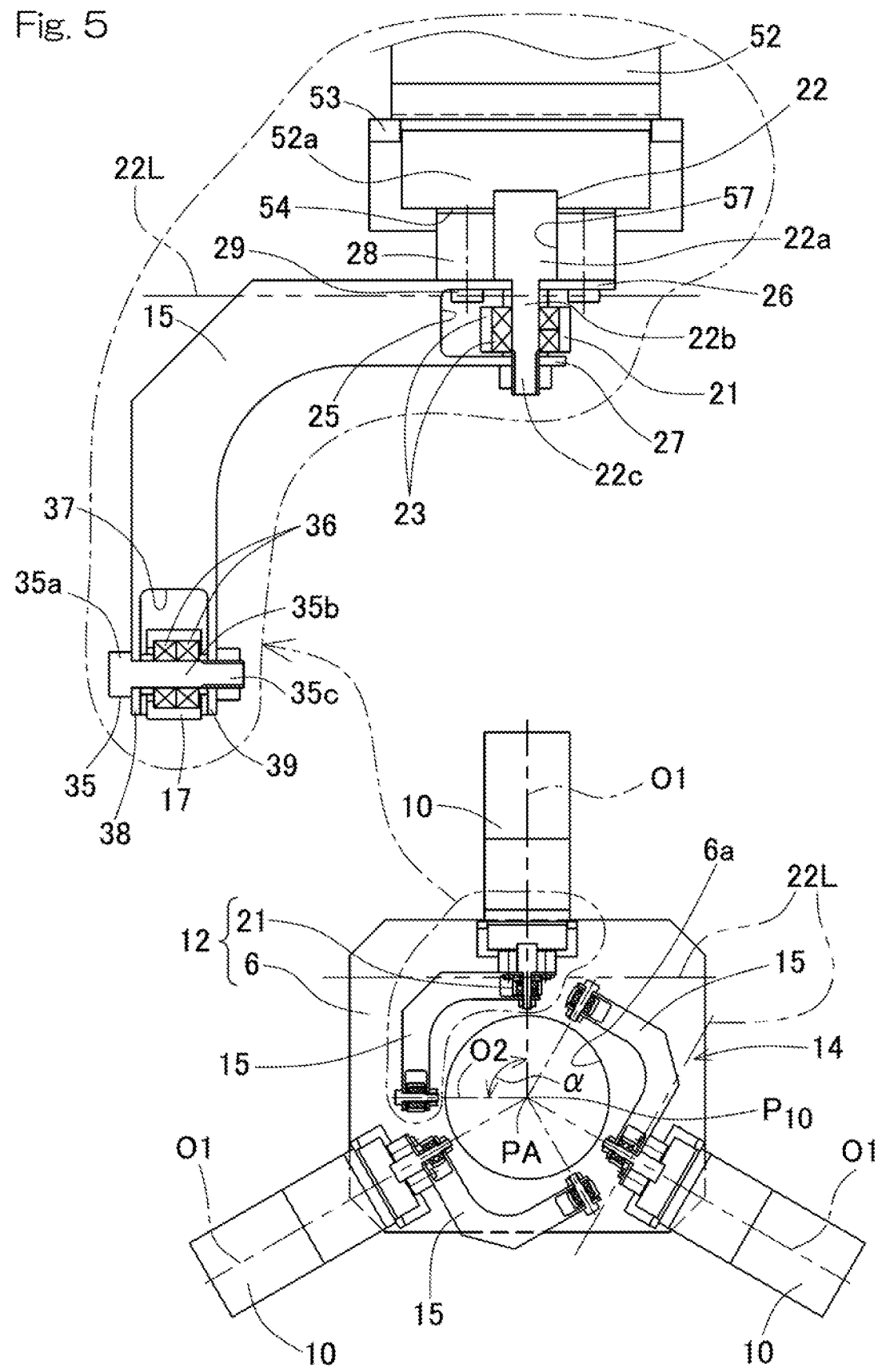
FIG. 5 shows a set of partial views in a cross section along a line V-V in FIG. 4.

FIG. 5 shows the relationship between the center PA of the spherical link mechanism, on one hand, and a central axis O1 of each revolute pair between the proximal end side-link hub 12 and the proximal end side-end link member 15, on the other hand. Although not shown, the shapes of and the relationship in position between the distal end side-link hub 13 (FIG. 4) and the distal end side-end link member 16 (FIG. 4) are also analogous to those in FIG. 5. The central axis O1 of each revolute pair between the proximal end side-link hub 12 and the proximal end side-end link member 15 and a central axis O2 of an associated revolute pair between the same proximal end side-end link member 15 and the intermediate link member 17 form an angle α of 90° therebetween. Note that the angle α may be different from 90°.

The three link mechanisms 14 have geometrically identical shapes. The geometrically identical shapes refer to shapes in which, no matter what position is depicted by a geometric model representing each link member 15, 16, 17 in a straight line—that is, a model described by each such revolute pair and straight lines connecting such revolute pairs—a proximal end side part and a distal end side part would be symmetric to each other with respect to a midpoint of an intermediate link member 17 as shown in FIG.

Figure 6:
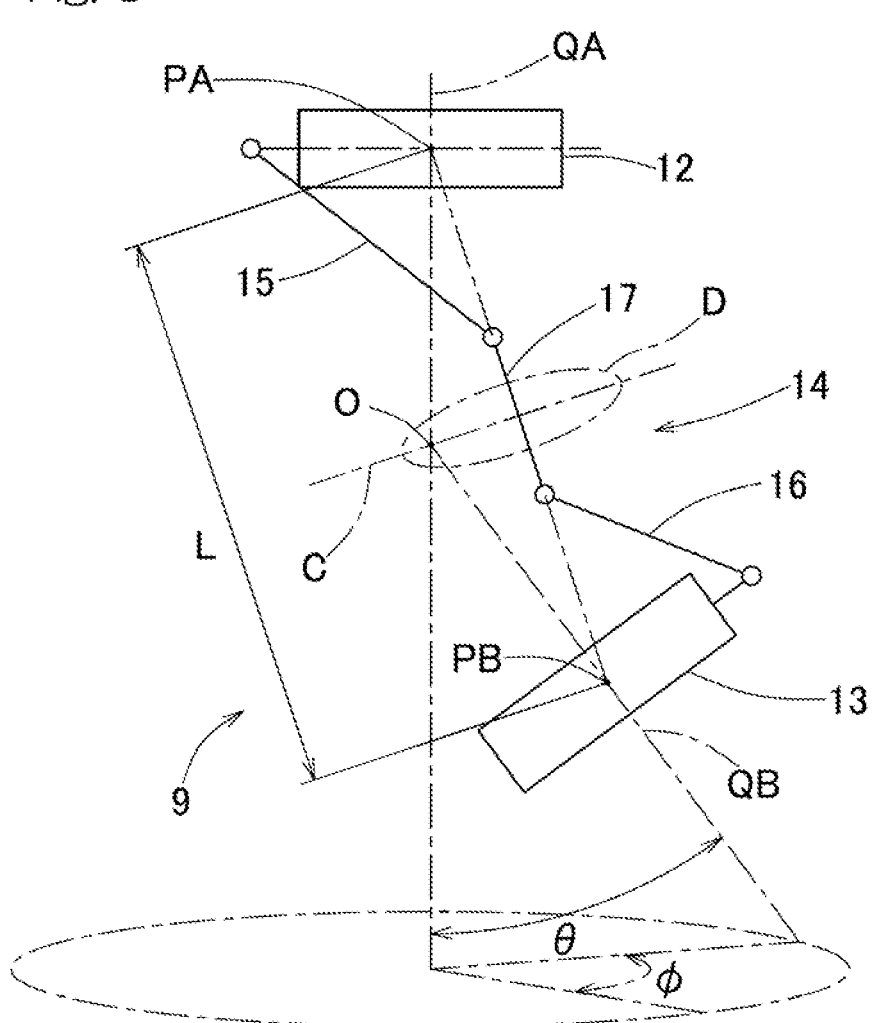
FIG. 6 shows one link mechanism of the link actuation apparatus as represented by straight lines.

6. FIG. 6 represents a single link mechanism 14 in straight lines. The parallel link mechanism 9 in this embodiment is of a rotationally symmetric design, whereby it is positioned and configured that a proximal end side part consisting of the proximal end side-link hub 12 and each proximal end side-end link member 15, on one hand, and a distal end side part consisting of the distal end side-link hub 13 and each distal end side-end link member 16, on the other hand, form a rotationally symmetric relationship in position to each other with respect to a mid-point line C for the intermediate link member 17. The mid-point of each intermediate link member 17 is located on a circle D with a common contour.

The proximal end side-link hub 12, the distal end side-link hub 13, and the three link mechanisms 14 form a structure having two degrees of freedom, in which rotation of the distal end side-link hub 13 relative to the proximal end side-link hub 12 is permitted about two perpendicular axes. In other words, this structure provides two degrees of freedom of rotation with which the attitude of the distal end side-link hub 13 relative to the proximal end side-link hub 12 can be varied. While being compact, this structure having two degrees of freedom leads to expansion in the range of movement of the distal end side-link hub 13 relative to the proximal end side-link hub 12.

For instance, the central axis QA of the proximal end side-link hub 12 is a straight line passing through the center PA of the proximal end side-spherical link mechanism, and meeting, at a right angle, the central axis O1 (FIG. 5) of each revolute pair between the proximal end side-link hub 12 and the proximal end side-end link member 15. Similarly, the central axis QB of the distal end side-link hubs 13 is a straight line passing through the center PB of the distal end side-spherical link mechanism, and meeting, at a right angle, the central axis O1 (FIG. 5) of each revolute pair between the distal end side-link hub 13 and the distal end side-end link member 16. In this case, a maximum bend angle θmax, which is a maximum of a bend angle θ between the central axis QA of the proximal end side-link hub 12 and the central axis QB of the distal end aide-link hub 13, can reach approximately ±90°. Further, a traverse angle □ of the distal end side-link hub 13 relative to the proximal end side-link hub 12 can be set to a value in the range of 0° to 360°. The bend angle θ is a vertical angle formed by inclination of the central axis QB of the distal end side-link hub 13 relative to the central axis QA of the proximal end side-link hub 12. On the other hand, the traverse angle □ is a horizontal angle formed by inclination of the central axis QB of the distal end side-link hub 13 relative to the central axis QA of the proximal end side-link hub 12. Note that the maximum bend angle θmax may be no less than 90°.

The attitude of the distal end side-link hub 13 relative to the proximal end side-link hub 12 can be varied by using, as a center of rotation, a point O of intersection between the central axis QA of the proximal end side-link hub 12 and the central axis QB of the distal end side-link hub 13. The solid lines in FIG. 7 indicate a state in which the central axis QA of the proximal end side-link hub 12 and the central axis QB of the distal end side-link hub 13 are colinear, while double-dotted lines in FIG. 7 indicate states in which the central axis QB of the distal end side-link hub 13 has assumed a given angle of actuation (i.e., a bend angle) relative to the central axis QA of the proximal end side-link hub 12. As illustrated in FIG. 6, even when the attitude of the distal end side-link hub 13 relative to the proximal end side-link hub 12 is varied, a distance L between the center PA of the proximal end side-spherical link mechanism and the center PB of the distal end side-spherical link mechanism remains unchanged.

As illustrated in FIGS. 5 and 6, when the following conditions 1 to 5 are all met in this parallel link mechanism 9, a proximal end side part consisting of the proximal end side-link hub 12 and each proximal end side-end link member 15 and a distal end side part consisting of the distal end side-link hub 13 and each distal end side-end link member 16 will make identical movements due to their geometrical symmetry. Accordingly, the parallel link mechanism 9 functions as a constant-velocity universal joint in which a proximal end side and a distal end side rotate at the same speed and at the same rotation angle when transmitting rotation from the proximal end side to the distal end side.

Condition 1: In each link mechanism 14, the angles of the central axes O1 of the revolute pair parts between the link hubs 12, 13 and the end link members 15, 16 in each link mechanism 14 are equal to each other, as well as the lengths of these central axes O1 from the spherical link centers PA, PB are equal to each other.

Condition 2: The central axes O1 of the revolute pair parts 31, 32 between the link hubs 12, 13 and the end link members 15, 16 and the central axes O2 of the revolute pair parts 33, 34 between the end link members 15, 16 and the intermediate link members 17 intersect each other at the spherical link centers PA, PB on the proximal side and the distal side, respectively.

Condition 3: The geometrical shapes of the proximal-side end link member 15 and the distal-side end link member 16 are the same.

Condition 4: The geometrical shapes of the proximal-side portion and the distal-side portion of the intermediate link member 17 are the same.

Condition 5: The angular positional relationships between the intermediate link member 17 and the end link members 15, 16 with respect to the symmetry plane of the intermediate link member 17 are identical on the proximal side and the distal side.

As illustrated in FIGS. 3 and 4, the proximal end side-link hub 12 includes a planar, proximal end member 6 and three, rotary shaft coupling members 21 provided integrally with this proximal end member 6. As illustrated in FIG. 5, the proximal end member 6 has a circular through bore 6a in a center thereof with the three, rotary shaft coupling members 21 being arranged at uniform intervals in a circumferential direction around this through bore 6a. As illustrated in FIGS. 4 and 5, the through bore 6a has a center that is located on the central axis QA of the proximal end side-link hub 12. A rotary shaft 22 is pivotably coupled to each of the rotary shaft coupling members 21 such that an axis thereof intersects with the central axis QA of the proximal end side-link hub 12. The proximal end side-end link member 15 is coupled, at one end thereof, to this rotary shaft 22.

As illustrated in FIG. 5, the rotary shaft 22 has a larger-diameter portion 22a, a smaller-diameter portion 22b, and a male threading portion 22c in a successive manner along an axial direction and is pivotably supported, at the smaller-diameter portion 22b, on a respective one of the rotary shaft coupling members 21 with two bearings 23 interposed therebetween. The bearings 23 are, for example, ball bearings such as a deep-groove ball bearing or an angular contact ball bearing. The outer peripheral surfaces of outer rings of these bearings 23 are installed and secured to an inner diameter groove provided in the respective one of the rotary shaft coupling members 21 by being fitted thereto. The same type and installation method also apply to bearings associated with the other revolute pairs.

The rotary shaft 22 is arranged at the larger-diameter portion 22a on the output shaft 52a of a speed reducer mechanism 52, which will be further discussed later, so as to be coaxial therewith. The proximal end side-end link member 15 is coupled, at said one end thereof, to the rotary shaft 22 so as to pivot as a unit with this rotary shaft 22. A cutout 25 is formed in said one end of the proximal end side-end link member 15 such that a pair of inner and outer rotary shaft support portions 26, 27 are formed by opposite side portions of this cutout 25. Respective through holes are made in the pair of these rotary shaft support portions 26, 27. Said respective one of the rotary shaft coupling members 21 is positioned inside the cutout 25 such that the smaller-diameter portion 22b of the rotary shaft 22 is inserted through said through holes and the inner peripheral surfaces of inner rings of the bearings 23. The male threading portion 22c of the rotary shaft 22 protrudes inwards of the inner rotary shaft support portion 27.

A spacer 28 is fitted on an outer periphery of the larger-diameter portion 22a of the rotary shaft 22. The proximal end side-end link member 15 and the output shaft 52a of the speed reducer mechanism 52 are secured by means of bolts 29 with this spacer 28 interposed therebetween. Further, a nut is threaded on the male threading portion 22c of the rotary shaft 22. Spacers are interposed between end faces of the inner rings of the bearings 23 and the pair of rotary shaft support portions 26, 27 so as to apply a preload to the bearings 23 when the nut is threaded in place.

A rotary shaft 35 is coupled at the other end of the proximal end side-end link member 15, which rotary shaft 35 is, in turn, pivotably coupled to one end of the intermediate link member 17. In an analogous manner to the rotary shaft 22 on the proximal end side-link hub 12, this rotary shaft 35 has a larger-diameter portion 35a, a smaller-diameter portion 35b, and a male threading portion 35c and is pivotably supported, at the smaller-diameter portion 35b, on said one end of the intermediate link member 17, with two bearings 36 interposed therebetween. A cutout 37 is formed in the other end of the proximal end side-end link member 15 such that a pair of inner and outer rotary shaft support portions 38, 39 are formed by opposite side portions of this cutout 37. Respective through holes are made in these rotary shaft support portions 38, 39. The male threading portion 35c protrudes inwards of the inner rotary shaft support portion 39.

Said one end of the intermediate link member 17 is positioned inside the cutout 37 such that the smaller-diameter portion 35b is inserted through said through holes and the inner peripheral surfaces of inner rings of the bearings 36. Further, a nut is threaded on the male threading portion 35c. Spacers are interposed between end faces of the inner rings of the bearings 36 and the pair of rotary shaft support portions 38, 39 so as to apply a preload to the bearings 36 when the nut is threaded in place.

Figure 7:
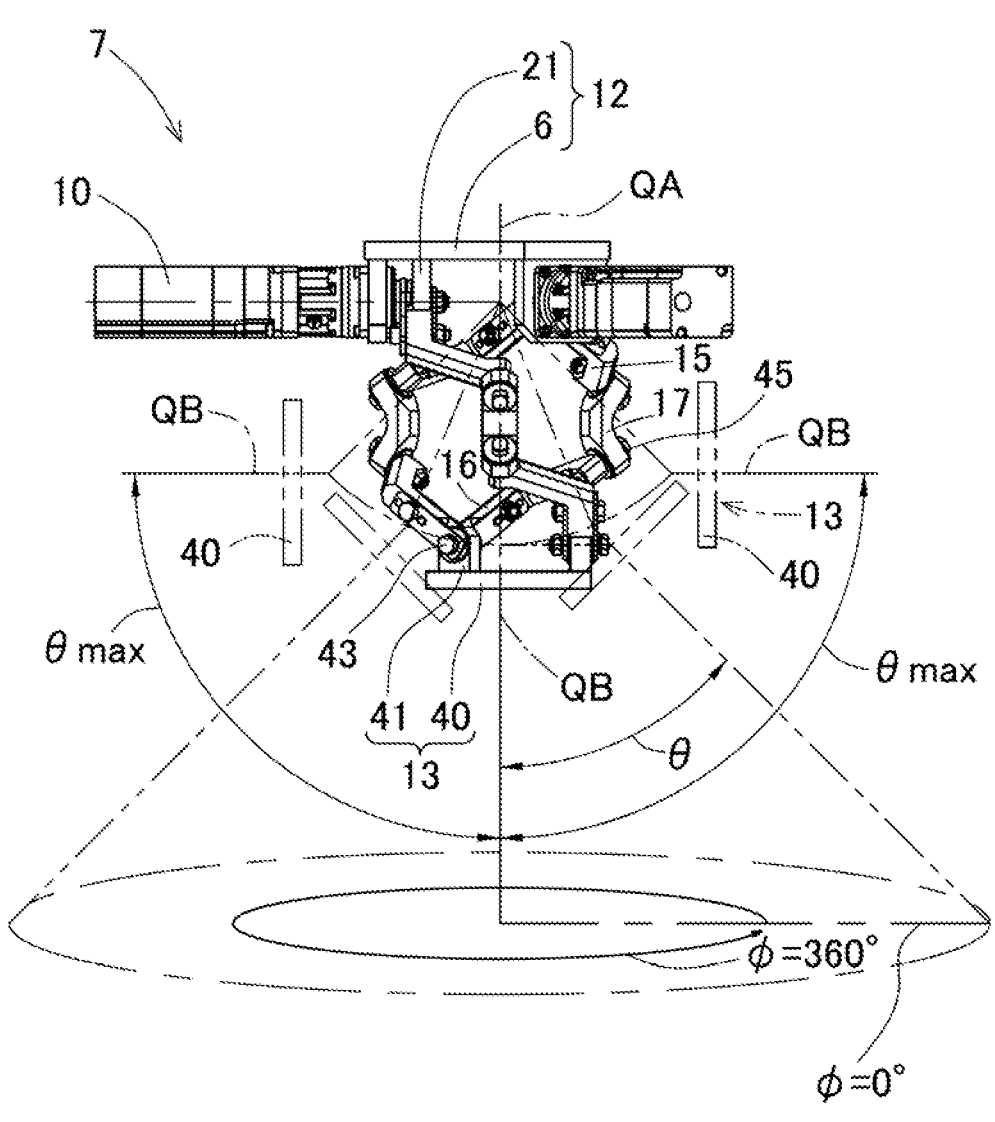
FIG. 7 shows the link actuation apparatus at bend angles including a maximum bend angle.

As illustrated in FIGS. 3 and 7, the distal end side-link hub 13 includes a planar, distal end member 40 and three, rotary shaft coupling members 41 provided on the bottom surface of this distal end member 40 so as to be evenly distributed in a circumferential direction. The circumference of the circle along which each of the rotary shaft coupling members 41 is positioned has a center that is located on the central axis QB of the distal end side-link hub 13. A rotary shaft 43 is pivotably coupled to each of the rotary shaft coupling members 41 such that an axis thereof intersects with the central axis QB of the distal end side-link hub 13.

The distal end side-end link member 16 is coupled, at one end thereof, to this rotary shaft 43. The other end of the distal end side-end link member 16 is coupled to a rotary shaft 45 which is, in turn, pivotably coupled to the other end of the intermediate link member 17.

The rotary shaft 43 on the distal end side-link hub 13 and the rotary shaft 45 on the intermediate link member 17 have identical shapes to that of the rotary shaft 35 and are likewise pivotably coupled to a respective one of the rotary shaft coupling members 41 and the other end of the intermediate link member 17, respectively, with two bearings (not shown) interposed therebetween.

<Attitude Control Actuators>

As illustrated in FIGS. 3 and 5, each of the attitude control actuators 10 is a rotary actuator equipped with said speed reducer mechanism 52 and is installed on the underside surface of the proximal end member 6 of the proximal end side-link hub 12 so as to be coaxial with the rotary shaft 22. The speed reducer mechanism 52 and a respective one of the attitude control actuators 10 are integrally provided, and the speed reducer mechanism 52 is secured to the proximal end member 6 by means of a motor fixing member 53. Note that each of the attitude control actuators 10 used may be equipped with a brake.

While in this example each of the three link mechanisms 14 is associated with a respective one of the attitude control actuators 10, the attitude of the distal end side-link hub 13 relative to the proximal end side-link hub 12 can be established as long as at least two of the three link mechanisms 14 are associated with respective ones of the attitude control actuators 10.

The three, attitude control actuators 10 are disposed such that rotary shafts 22 therefor extend perpendicular to the central axis QA (FIG. 4) of the proximal end side-link hub 12. Such rotary shafts 22 for these attitude control actuators 10 define an intersecting point, which is a centralized location P10, on the central axis QA (FIG. 4) of the proximal end side-link hub 12 forming said angle θt (FIG. 2). Also, for two of the three, attitude control actuators 10, bisectors 22L of such rotary shafts 22 meet a plane defined by the axis Ca of rotation of the rotation actuator Ra and the central axis QA of the proximal end side-link hub 12. Each of the bisectors 22L is a line extending perpendicular to the axis of a respective one of such "rotary shafts 22" and passing through a mid-point between the base end of the larger-diameter portion 22a and the tip end of the male threading portion 22c in a longitudinal direction of said respective one of such "rotary shafts 22." Further, each of the bisectors 22L is situated on the side of an acute angle formed between the axis Ca of rotation of the rotation actuator Ra and the central axis QA of the proximal end side-link hub 12.

As illustrated in FIG. 5, the speed reducer mechanism 52 is of a flange output design and includes said output shaft 52a with a wide diameter. The tip end face of the output shaft 52a defines a planar flange face 54 extending perpendicular to a centerline of the output shaft 52a. The output shaft 52a is coupled to one of the rotary shaft support portions 26 of the proximal end side-end link member 15 by means of said bolts 29 with said spacer 28 interposed therebetween. The larger-diameter portion 22a of the rotary shaft 22 which forms a revolute pair unit of the proximal end side-link hub 12 (FIG. 4) and the proximal end side-end link member 15, is fitted into an inner diameter groove 57 provided in the output shaft 52a of the speed reducer mechanism 52.

As illustrated in FIGS. 4 and 5, the parallel link mechanism 9 of the link actuation apparatus 7 is actuated by driving each of the attitude control actuators 10 into rotation. More specifically, when each of the attitude control actuators 10 is driven into rotation, that rotation is transmitted at a reduced speed through the speed reducer mechanism 52 to a respective rotary shaft 22. This causes a change in the angle of the proximal end side-end link member 15 relative to the proximal end side-link hub 12, thereby varying the attitude of the distal end side-link hub 13 such that it assumes a given attitude relative to the proximal end side-link hub 12.

<Rotation Actuator>

Figures 8A, 8B:
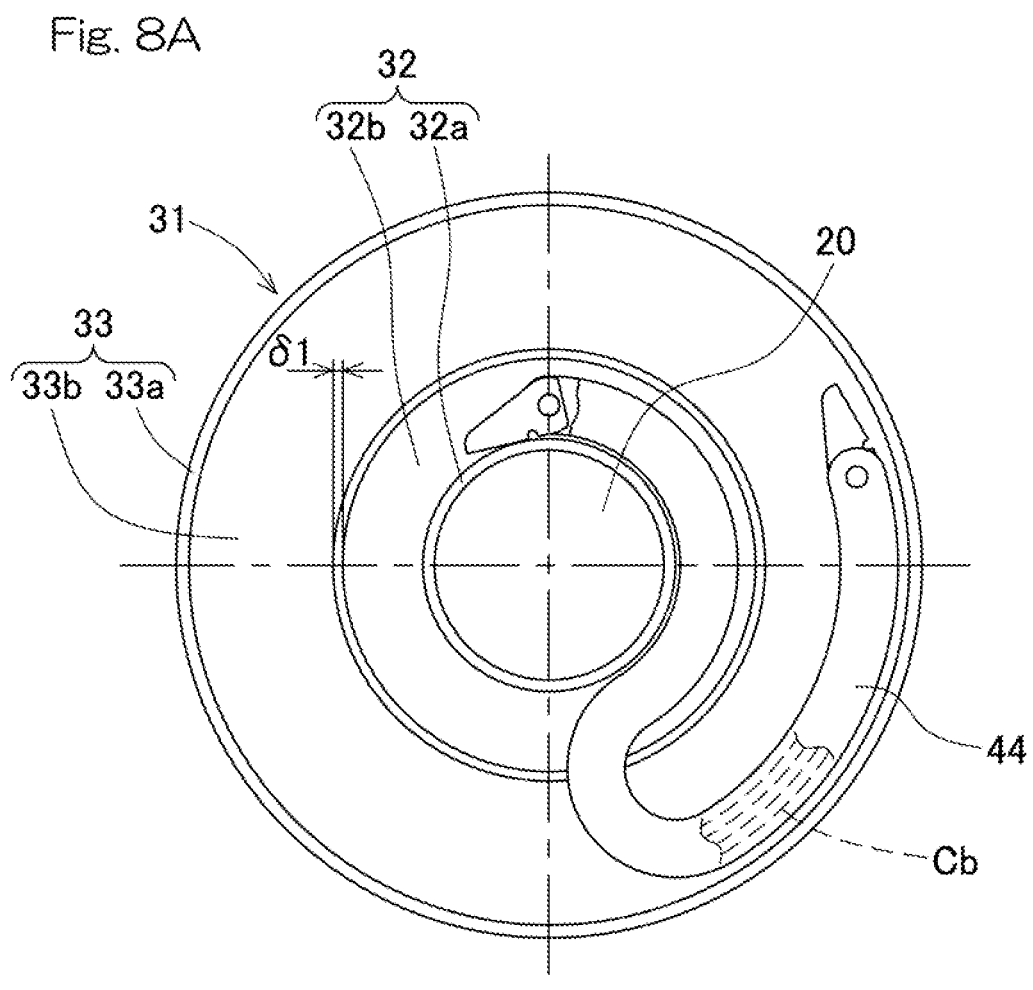
FIG. 8A shows a horizontal cross sectional view of a rotation actuator of the rotation unit.
FIG. 8B shows a longitudinal cross sectional view of the rotation actuator.

As illustrated in FIG. 1, the rotation actuator Ra is mounted to said output portion of the linear motion unit 63 which will be further discussed later. As illustrated in FIGS. 2, 8A, and 8B, the rotation actuator Ra includes a rotation control actuator main component 18 and a speed reducer 19 that reduces the speed of rotation from this actuator main component 18. In this example, a speed reducer-equipped motor in which the actuator main component 18 and the speed reducer 19 are integrally provided is used as the rotation actuator Ra. Also, while in this example the proximal end side-link hub 12 of the link actuation apparatus 7 and the rotation actuator Ra are mounted such that the central axis QA and the axis Ca of rotation intersect, they may be mounted such that the axes do not intersect.

A coupling member 20 which is mounted to said output portion of the linear motion unit 63 (FIG. 1) has a plurality of pillars 24 arranged thereon in parallel and upright manner. A rotation actuator fixing member 30 is installed on the tip ends of these pillars 24, and the speed reducer-equipped motor is secured to this rotation actuator fixing member 30. The output portion Raa of the rotation actuator Ra rotates about the axis Ca of rotation thereof by a rotational angle θp. The rotational angle θp is, at maximum, in the range of ±180°.

The speed reducer 19, which serves as the output portion Raa of the rotation actuator Ra, has an output shaft to which said mounting member 3 is secured by means of a bolt, etc. The link actuation apparatus 7 is installed to that output shaft of the rotation actuator Ra in a manner inclined by the angle θt with the aid of the mounting member 3. More specifically, the mounting member 3 is provided, at a tip end thereof, with a slope surface 3a which is inclined by a predetermined angle relative to the axis Ca of rotation of the rotation actuator Ra. The proximal end member 6 of the proximal end side-link hub 12 is secured by means of a bolt, etc. to this slope surface 3a with said spacer 4 interposed therebetween.

Said angle θt is set to a value in the angular range of more than 0° to no more than 90° (i.e., 0°<θt≤90°). In this non-limiting example, the angle θt is 45°. Also, the link actuation apparatus 7 is mounted such that the central axis QA of the proximal end side-link hub 12 and the axis Ca of rotation of the rotation actuator Ra intersect with each other. In such a configuration, the link actuation apparatus 7 rotates about the axis CA of rotation of the rotation actuator Ra while being inclined by the angle θt relative to that axis Ca of rotation.

<End Effector>

Said end effector Ee is mounted to the distal end member 40 of the distal end side-link hub 13. The end effector Ee is, for example, a hand including a gripper, a cleaning nozzle, a dispenser, a welding torch, an imaging instrument Eg (FIG. 14), etc.

Figure 14:
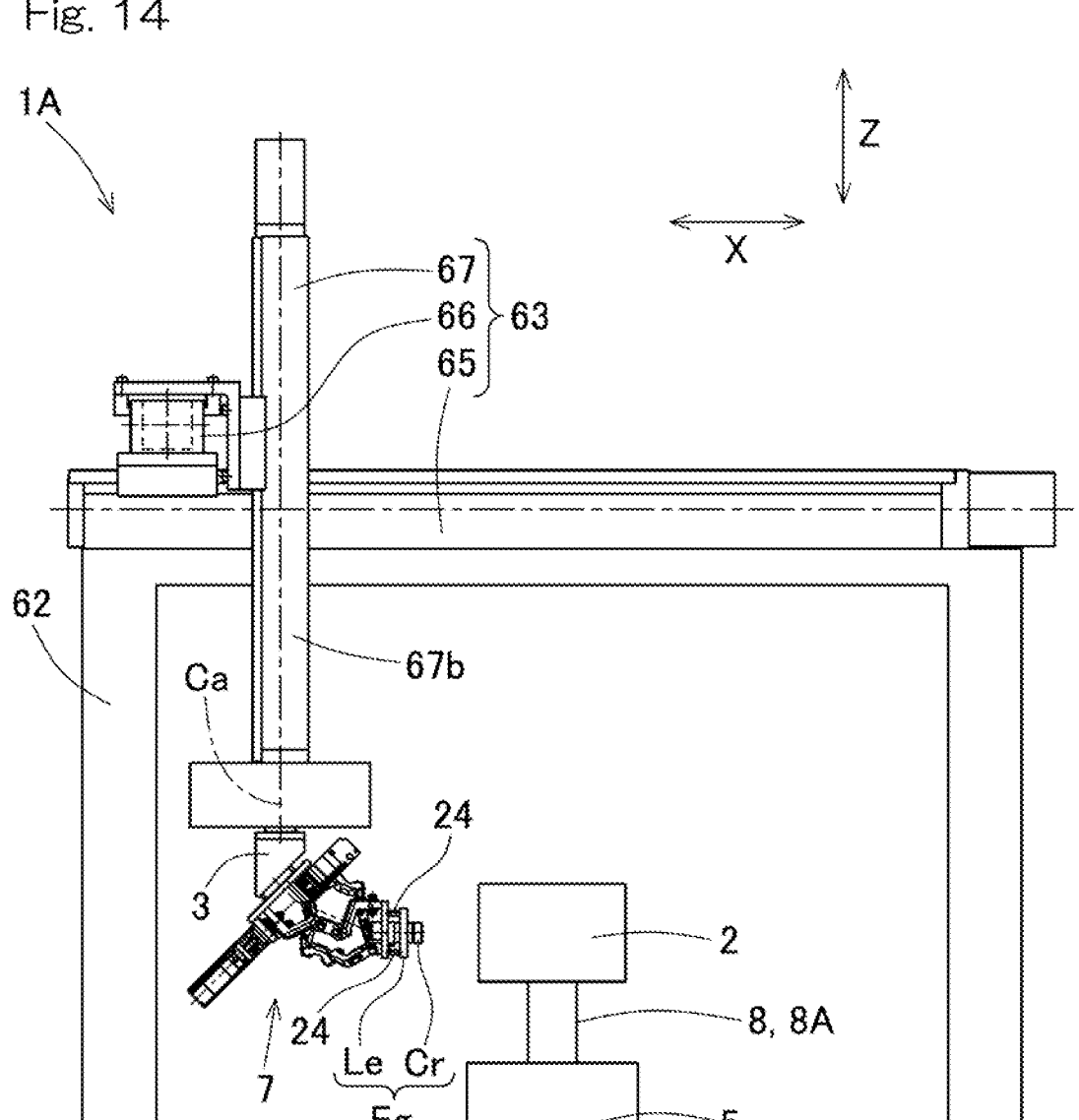
FIG. 14 shows a front elevational view of an appearance inspection device with an imaging instrument installed to the link actuation apparatus.

The imaging instrument Eg as shown in FIG. 14 includes, for example, a camera Cr that captures images of a workpiece 2, an illuminator Le that illuminates the workpiece 2, etc. The operation device, in this case, is an appearance inspection device 1A with the imaging instrument Eg installed to the link actuation apparatus 7. The camera Cr and the illuminator Le connect via a wiring to a camera control system (not shown) that executes various control at the time of image capturing.

<Cover, Cable Carrier, Etc.>

As illustrated in FIGS. 8A and 8B, a cover 31 is disposed around the rotation actuator Ra. The cover 31 includes a cover stationary element 32 and a cover rotational element 33, each of which is cylindrical. These cover stationary element 32 and cover rotational element 33 are coaxial with each other and are arranged so as to be coaxial to the axis Ca of rotation of the rotation actuator Ra. Further, the cover rotational element 33 is formed to have a diameter that is larger than that of the cover stationary element 32 and is provided in a manner capable of rotating relative to the cover stationary element 32.

The cover stationary element 32 includes a cylindrical part 32a secured to the rotation actuator fixing member 30 by means of a bolt, etc. and a flange part 32b extending radially outwards from a base end portion of this cylindrical part 32a. The base end portion of the cylindrical part 32a is secured, on the inner peripheral surface thereof, to an outer peripheral surface of the rotation actuator fixing member 30.

The cover rotational element 33 includes a cylindrical part 33a and a flange part 33b extending radially inwards from a base end portion of this cylindrical part 33a. The mounting member 3 that is mounted to the output portion Raa of the rotation actuator Ra is provided with a planar, rotational element mounting member 34. This rotational element mounting member 34 is arranged in a manner coaxial to the axis Ca of rotation of the rotation actuator Ra. The flange part 33b of the cover rotational element 33 is installed to an outer peripheral portion of the rotational element mounting member 34 with a spacer 42 interposed therebetween. Thus, the cover rotational element 33 rotates in unison with the output portion Raa of the rotation actuator Ra. An annular clearance 61 is provided between an inner peripheral side edge portion of said flange part 33b and an outer peripheral side edge portion of the flange part 32b of the cover stationary element 32 for preventing any interference between the two flange parts 33b, 32b.

A cable carrier 44 is positioned in an annular volume enclosed between the cover rotational element 33 and the cover stationary element 32. The cable carrier 44 guides cables Cb extending from the attitude control actuators 10 and the end effector Ee (FIG. 2) while protecting the cables Cb. Note that, in FIG. 8B, the cable carrier is omitted. This cable carrier 44 is disposed around the rotation actuator Ra so as to slide in a direction of rotation. The cable carrier 44 has one end and the other end, in a longitudinal direction thereof, that are secured by means of a bolt, etc. to a portion of the cover rotational element 33 and a portion of the cover stationary element 32, respectively. In this way, the cable carrier 44 is guided by their respective cylindrical parts 32a, 33a and flange parts 32b, 33b. The cables Cb include, in particular, an encoder cable, a power cable, etc. connecting to the attitude control actuators 10.

<Linear Motion Unit>

Figure 9:
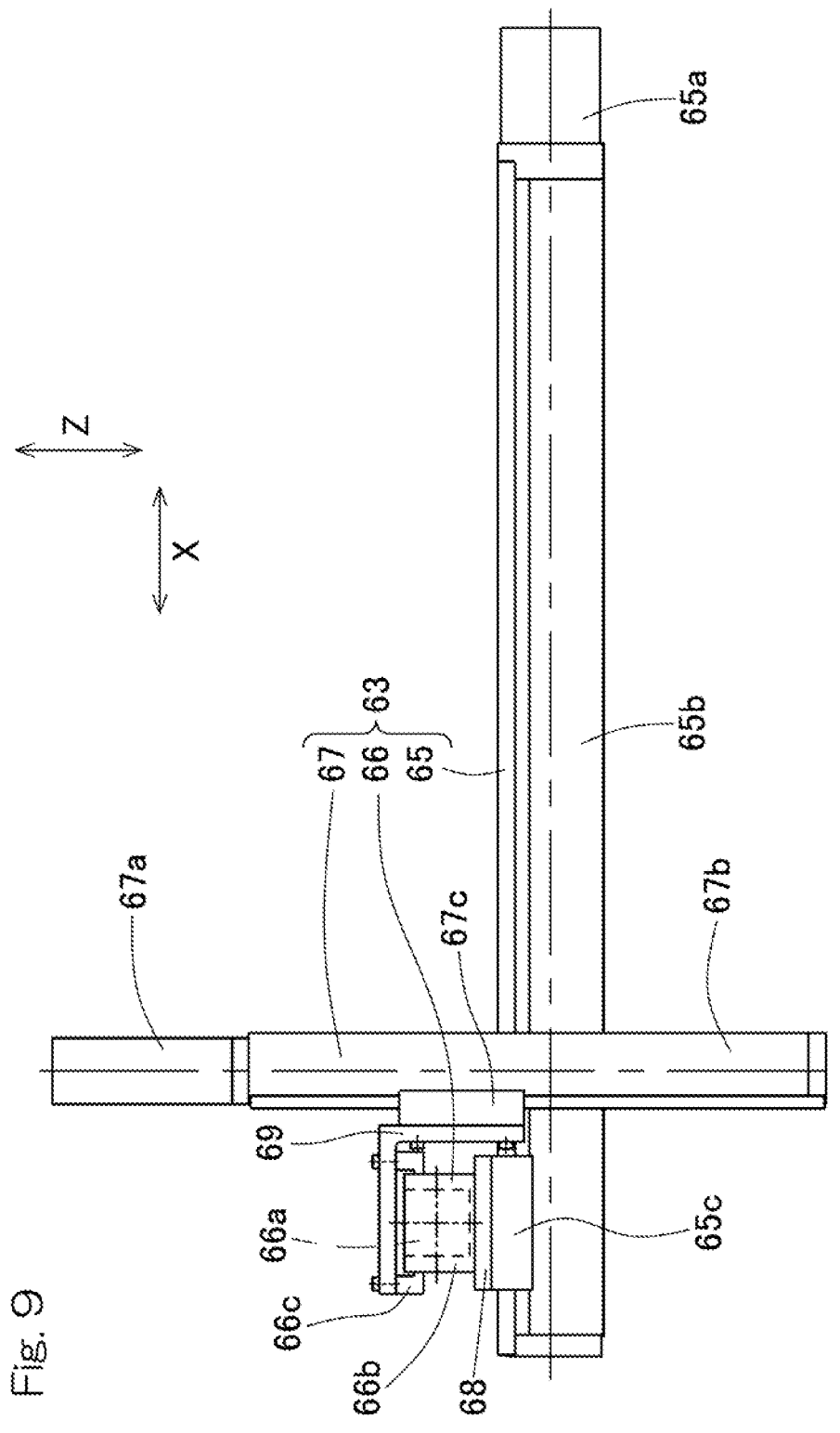
FIG. 9 shows a front elevational view of a linear motion unit of the operation device.
Figure 10:
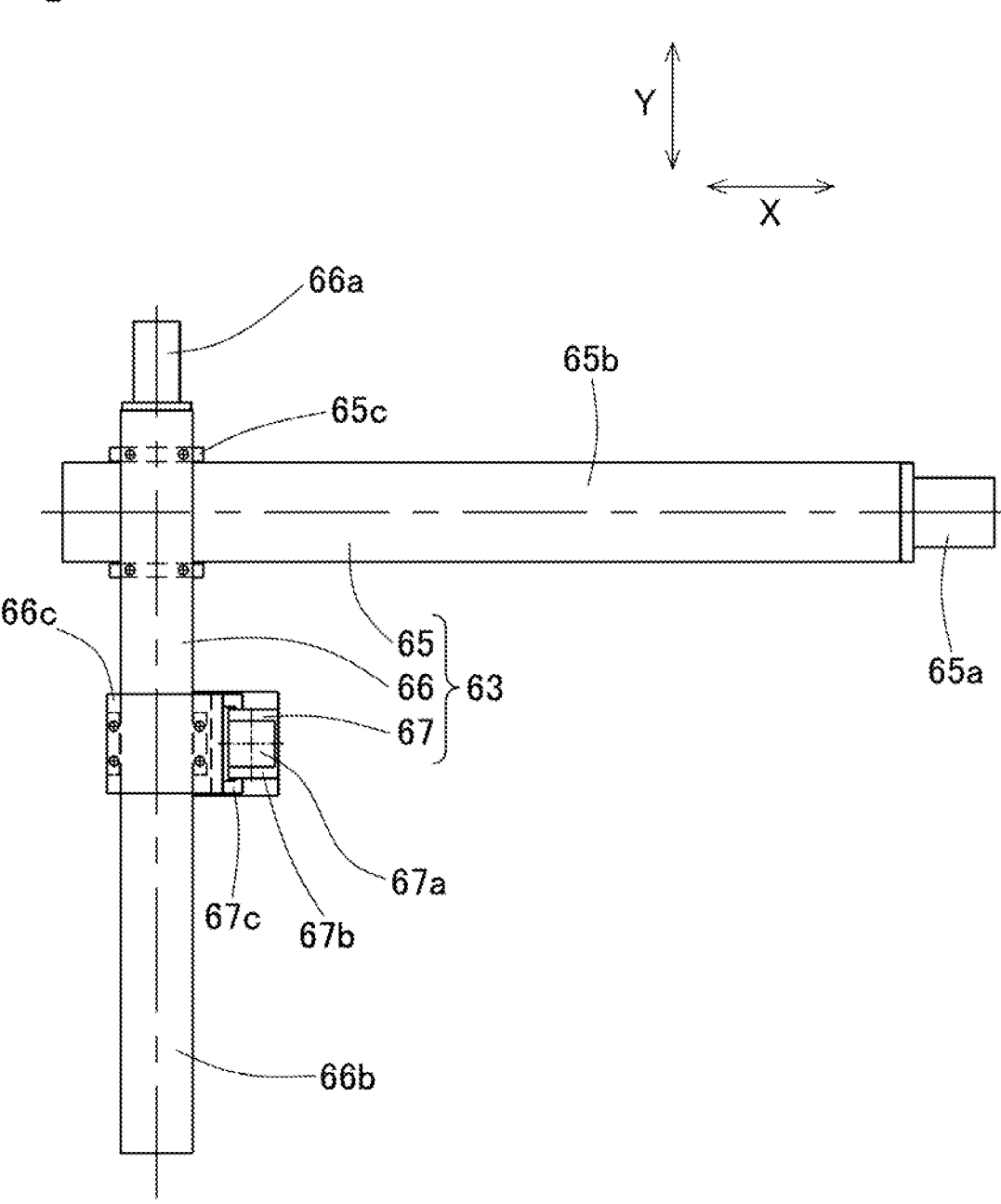
FIG. 10 shows a top view of the linear motion unit.

As illustrated in FIGS. 1, 9, and 10, the linear motion unit 63 includes an XYZ stage that produces a movement in directions along three perpendicular axes. The linear motion unit 63 includes first, second, and third linear actuators 65, 66, 67. The first linear actuator 65 produces an advance and retraction in directions along the X-axis (i.e., left and right directions in FIG. 1). The second linear actuator 66 produces an advance and retraction in directions along the Y-axis which are forward and rearward directions perpendicular to those directions along the X-axis. The third linear actuator 67 produces an advance and retraction in directions along the Z-axis which extend perpendicular to each of those directions along the X-axis and the Y-axis. In this example, said direction along the Z-axis is configured to be a direction along the vertical direction.

The first, second, and third linear actuators 65, 66, 67 are driven, respectively, by motors 65a, 66a, 67a serving as drive sources and each include a converter mechanism (not shown) such as a ball screw that converts rotation from a respective one of the motors 65a, 66a, 67a to a linear motion in either direction. The first linear actuator 65 includes a guide 65b serving as a first slid-upon component and a slide table 65c serving as a first slider component, in addition to said motor 65a. The guide 65b serving as the first slid-upon component extends along those directions along the X-axis.

The second linear actuator 66 includes a guide 66b serving as a second slid-upon component and a slide table 66c serving as a second slider component, in addition to said motor 66a. The guide 66b serving as the second slid-upon component extends along those directions along the Y-axis. The first and second linear actuators 65, 66 are arranged such that directions of advance and retraction of the slide tables 65c, 66c serving as the first and second slider components are perpendicular to each other.

The third linear actuator 67 includes a slide table 67c serving as a third slid-upon component and said guide 67b serving as a third slider component, in addition to said motor 67a. The guide 67b serving as the third slider component extends along those directions along the Z-axis. The third linear actuator 67 is arranged such that a direction of advance and retraction of the guide 67b serving as the third slider component is perpendicular to the directions of advance and retraction of the slide tables 65c, 66c serving as the first and second slider components.

The guide 65b of the first linear actuator 65 is mounted to said frame 62, such that the slide table 65c is driven to advance and retract along the guide 65b extending in those directions along the X-axis. The guide 66b of the second linear actuator 66 is coupled to this slide table 65c by means of a coupling and fixing member 68. The slide table 66c is driven to advance and retract along the guide 66b extending in those directions along the Y-axis, and the slide table 67c is coupled to this slide table 66c by means of a coupling and fixing member 69. Note that the slide table 67c of the third linear actuator 67 may instead be directly secured to the slide table 66c of the second linear actuator 66. The guide 67b of the third linear actuator 67, which is driven to advance and retract relative to the slide table 67c, serves as the output portion of the linear motion unit 63.

The rotation unit Ru is mounted to the guide 67b serving as the output portion. Accordingly, the guide 67b has a lower end to which the rotation actuator Ra is mounted, and this rotation actuator Ra is mounted such that the axis Ca of rotation thereof is parallel to the direction of advance and retraction of the third linear actuator 67 (i.e., vertical direction in this example). In the context of the instant embodiment, the guide 67b of the third linear actuator 67 has a lower end to which the rotation unit Ru is installed, such that the guide 67b of the third linear actuator 67 moves in unison with the rotation unit Ru. This allows the number of parts around the rotation unit Ru to be reduced, thereby allowing for a space for an operation to be expanded. Note that the axis Ca of rotation of the rotation actuator Ra may form an angle relative to the direction of advance and retraction of the third linear actuator 67. While in the instant embodiment the rotation unit Ru is installed to the lower end of the guide 67b of the third linear actuator 67, the rotation unit Ru may be installed to a place, different than said lower end, on the guide 67b of the third linear actuator 67. The first or second linear actuator 65, 66 may serve as the output portion of the linear motion unit 63. Further, the guide 67b may be secured to the second actuator 66, while the rotation unit Ru is secured to the slide table 67c and allowed to move. In this case, the guide 67b corresponds to the third slid-upon component, while the slide table 67c corresponds to the third slider component.

<Example Operation Using Operation Device>

FIG. 1 depicts a state in which the end effector Ee is precisely oriented to the horizontal so as to perform an operation on a left lateral surface of a workpiece 2. This state corresponds to the link actuation apparatus 7 with the bend angle $\theta=45°$ and the traverse angle $\square=0°$. Note that the rotational angle $\theta p$ of the rotation actuator Ra in this state is defined as $0°$, while a counterclockwise direction as viewed in a plan view is defined as a positive direction in the instant embodiment.

Figure 11:
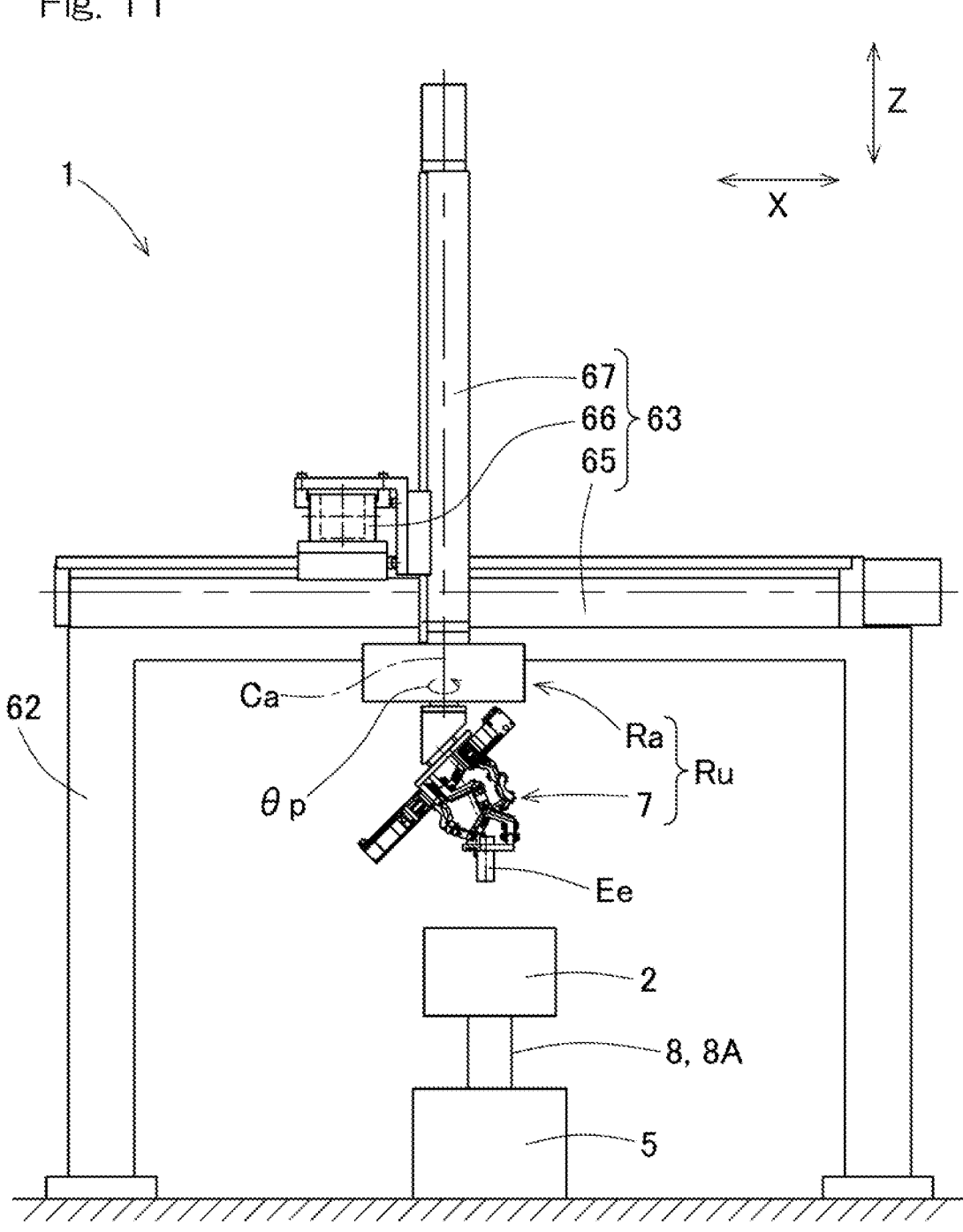
FIG. 11 shows a front elevational view of the operation device illustrating how an operation may be performed on the top surface of a workpiece.

FIG. 11 depicts a state in which an operation is performed on the top surface of the workpiece 2. The state corresponds to the link actuation apparatus 7 with the bend angle $\theta=45°$ and the traverse angle $\square=180°$, with the end effector Ee precisely oriented to the vertical in a downward direction. No change has been made to the rotational angle $\theta p$ of the rotation actuator Ra from the state of FIG. 1.

Figure 12:
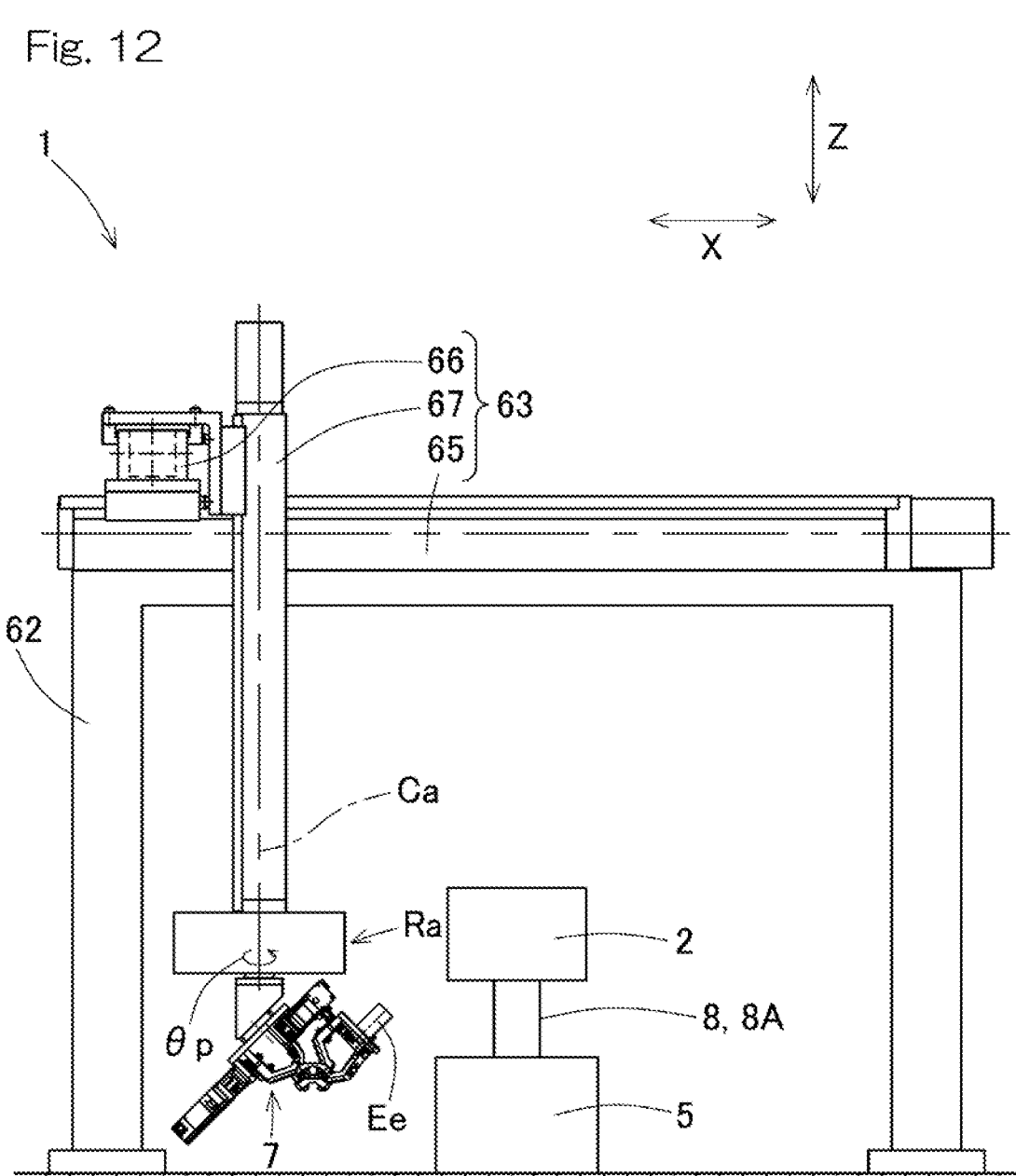
FIG. 12 shows a front elevational view of the operation device illustrating how an operation may be performed on the bottom surface of the workpiece.

FIG. 12 depicts a state in which an operation is performed on the bottom surface of the workpiece 2. The state corresponds to the link actuation apparatus 7 with the bend angle $\theta=90°$ and the traverse angle $\square=0°$, with the end effector Ee oriented obliquely upwards. No change has been made to the rotational angle $\theta p$ of the rotation actuator Ra from the state of FIG. 1.

Figure 13:
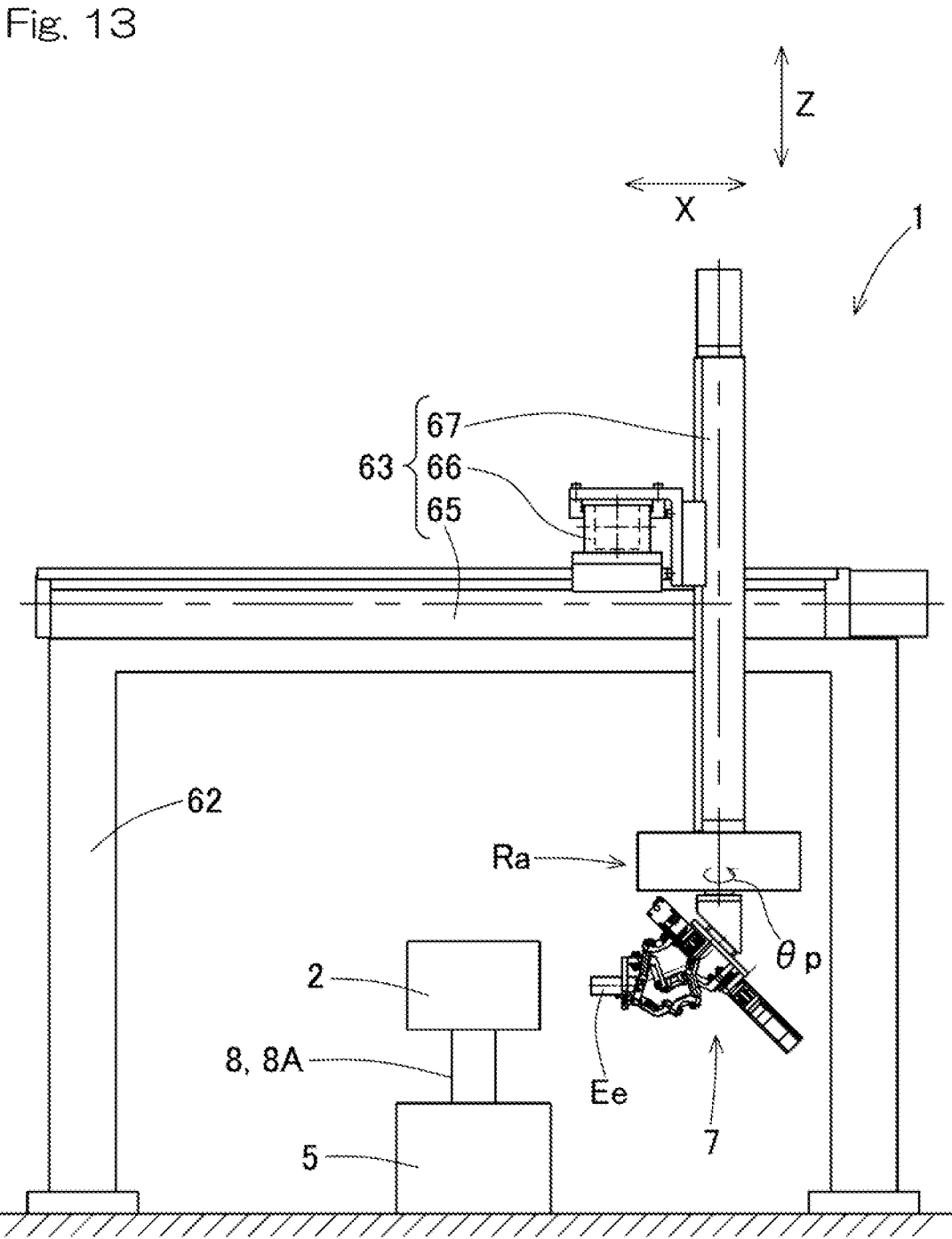
FIG. 13 shows a front elevational view of the operation device illustrating how an operation may be performed on the right lateral surface of the workpiece.

FIG. 13 depicts a state in which an operation is performed on a right lateral surface of the workpiece 2. The state corresponds to the link actuation apparatus 7 with the bend angle $\theta=450$ and the traverse angle $\square=0°$ with the end effector Ee precisely oriented to the horizontal, similarly to the state of FIG. 1; however, the rotation actuator Ra has rotated by $180°$ (i.e., the rotational angle $\theta p=180°$).

Although not shown, the rotation actuator Ra will be rotated by $90°$ in a clockwise direction (i.e., the rotational angle $\theta p=-90°$) from the state of FIG. 1 in order to perform an operation on a rear lateral surface of the workpiece 2. The rotation actuator Ra can be rotated by $90°$ in the counter-clockwise direction (i.e., the rotational angle $\theta p=90°$) from the state of FIG. 1 in order to perform an operation on a front lateral surface of the workpiece 2.

While, in this context, an example operation for a cuboid-shaped workpiece 2 has been presented, the rotational angle $\theta p$ of the rotation actuator Ra and the attitude (i.e., the bend angle $\theta$ and the traverse angle $\square$) of the link actuation apparatus 7 can also be determined for a workpiece having a cylindrical or a more complicated shape in such a manner that accounts for the shape of the workpiece. Accordingly, an operation can also be performed for a workpiece 2 with any shape. While, in the instant embodiment, examples with the mounting angle $\theta t=45°$ have been presented, the mounting angle $\theta t$ may have any other value. While the first linear actuator is secured to the frame along the X-axis, the first linear actuator may be secured to the frame, etc. along any other axis. Further, while the frame is secured to the ground (or a floor), it may instead be secured to a ceiling, a wall, etc.

<Functions and Effects>

According to the operation device 1 that has thus far been described, using the link actuation apparatus 7 that is at the angle θt relative to the rotation actuator Ra mounted to the output portion of the linear motion unit 63 and rotating the former relative to the latter for performing an operation, allows a workpiece 2 to be approached in the directions of more than a half-sphere side of the workpiece 2 even when the maximum bend angle θmax of the link actuation apparatus 7 is 90°. For example, when the rotation actuator Ra is disposed in a vertically downward orientation and the link actuation apparatus 7 is mounted at the angle θt, a workpiece 2 can be approached not only in the directions of a north hemisphere side of the workpiece 2 but also in the directions of a south hemisphere side of the workpiece 2. Thus, a zone of operation which is larger than hitherto can be ensured for the workpiece 2, and shortening of a changeover process can be achieved. Furthermore, the inclusion of the link actuation apparatus 7 in the rotation unit Ru allows a high speed, highly precise, and intricate operation, like an operation by hand, to be implemented.

Two or more of the attitude control actuators 10 are disposed such that rotary shafts 22 for the attitude control actuators 10 extend perpendicular to the central axis QA of the proximal end side-link hub 12. Such rotary shafts 22 for the attitude control actuators 10 define an intersecting point (i.e., the centralized location P10) on the central axis QA of the proximal end side-link hub 12 forming the angle θt. Further, for two of the two or more of the attitude control actuators 10, the bisectors 22L of such rotary shafts 22 meet a plane defined by the axis Ca of rotation of the rotation actuator Ra and the central axis QA of the proximal end side-link hub 12, and the bisectors 22L are situated on the side of an acute angle θt formed between the axis Ca of rotation of the rotation actuator Ra and the central axis QA of the proximal end side-link hub 12.

According to this configuration, the attitude control actuators 10 of the link actuation apparatus 7 are less likely to interfere with the rotation actuator Ra, than those of a link actuation apparatus with a different directional inclination, and the rotation actuator Ra and the link actuation apparatus 7 can be positioned so as to reduce a distance therebetween. Thus, a more compact design of the operation device as a whole can be achieved. Further, a smaller moment of inertia of the rotation actuator Ra and a decrease in the weight of the rotation unit Ru are achieved, thereby allowing for a high-speed operation of the operation device as a whole to be implemented.

The rotation actuator Ra includes a rotation control actuator main component 18 and a speed reducer 19, and therefore, can achieve a compact dimension in a radial direction, as compared to that of a rotation actuator employing a rotary drive system with no speed reducer. Cables Cb connecting to the attitude control actuators 10 of the link actuation apparatus 7, etc. can be stored in a compact fashion by a cable carrier 44, by disposing the cable carrier 44 in an unoccupied space around the rotation actuator Ra so as to slide in a direction of rotation. This facilitates the routing of the cables Cb and can also relieve concerns about a breakage in the cables Cb, etc.

The linear motion unit 63 may include a first linear actuator 65 mounted to a frame 62, a second linear actuator 66, and a third linear actuator 67 serving as the output portion of the linear motion unit 63. This enables an operation to be performed for a workpiece 2 that is being or has been conveyed by a conveyor, etc., and can be installed, for example, as a single unit with no need to modify a conveyor line.

By arranging the linear motion unit 63 so as to provide a movement in directions along three perpendicular axes, an intuitive use of the operation device 1 can be realized. Thus, the usability of the operation device 1 is improved, and also the balance of the operation device 1 becomes more stable, thereby allowing a high speed operation to be implemented.

The third linear actuator 67 is arranged such that a direction of advance and retraction of the guide 67b serving as the third slider component is a vertical direction, and the third slid-upon component is the slide table 67c of the same linear actuator 67. In this way, possible interferences between a workpiece 2 and the third slider component in the linear motion unit 63 are more easily avoided, and a more compact size of the operation device as a whole can be achieved. With the configurations that have been discussed, a zone of operation for a workpiece 2 can be expanded. This, among other things, could render the third slider component of the third linear actuator 67 that serves as the output of the linear motion unit 63 be at more risk of coming into contact with the workpiece 2. In an instance, like the instant configuration, where the third slider component in the form of the guide 67b is displaced in a vertical direction, it is possible for the linear motion unit to displace the guide 67b to an interference-free position in relation to the workpiece 2, while producing a high speed movement in various directions.

The rotation actuator Ra is arranged such that the axis Ca of rotation thereof is parallel to a direction of advance and retraction of the third slider component. This facilitates an operation for a workpiece 2 that is being or has been conveyed by a conveyor, etc. When an operation is to be performed on a workpiece that is being or has been conveyed by a conveyor, etc., the top surface and a lateral surface of the workpiece are mainly the ones to be operated upon. If one wishes to perform an operation for the bottom surface, etc. of the workpiece, then, the workpiece is often flipped over itself to accommodate this need. In the instant configuration, not only can an operation be conducted for the top surface and lateral surface of the workpiece 2, but the workpiece 2 is also ready to be operated upon from the bottom surface side thereof, and the need for a changeover, etc. therefor can, in turn, be obviated.

The link actuation apparatus 7 may have a maximum bend angle θmax of no less than 90° between the central axis QA of the proximal end side-link hub 12 and the central axis QB of the distal end side-link hub 16. In this case, even when the angle θt formed between the central axis QA of the proximal end side-link hub 12 and the axis Ca of rotation of the rotation actuator Ra in the link actuation apparatus 7 is small, a large zone of operation for a workpiece 2 can be ensured.

In case of an appearance inspection device 1A with an imaging instrument Eg installed to the link actuation apparatus 7, an appearance inspection procedure that is hitherto performed through visual inspection from different directions by humans can be automated at a high speed and with a high precision. Also, appearance inspection of a workpiece 2 can be conducted from various directions for any scratch, dents, the presence or absence of a certain part, etc. Further, when the link actuation apparatus 7 permits a cabling, which connects to the imaging instrument Eg including a camera Cr and an illuminator Le, among other things, to pass through its internal spaces, the routing of the cabling can be simplified with less chance of the cabling being twisted even after repeated movements in a turning or traverse direction, while also mitigating troubles such as a breakage.

<Re: Further Embodiments>

In the remainder of the discussion, elements corresponding to those elements previously discussed in connection with the various embodiments will be indicated with the same reference signs therefrom, while omitting their discussions to avoid redundancy. In the context where only a subset of features are discussed, the remaining features are deemed to be equivalent to those in the previously described embodiments unless otherwise noted. The same features produce the same functions and effects. Aside from combinations of parts particularly discussed in connection with the various embodiments, partial combinations among the embodiments themselves are also possible unless such combinations prove to be inoperable.

Second Embodiment

An operation device in accordance with a second embodiment will be described in connection with FIGS. 15 to 18.

This operation device 1B represents an example differing from the aforementioned embodiment (FIG. 1) in that the mounting angle θt for the link actuation apparatus 7 has been changed from 45° to 90°. Thus, the link actuation apparatus 7 is mounted such that the central axis QA of the proximal end side-link hub 12 is perpendicular to the axis Ca of rotation of the rotation actuator Ra. In fact, the link actuation apparatus 7 is mounted to the mounting member 3 after having also been rotated by 180° about the central axis of the proximal end side-link hub 12 thereof.

<Attitude of Link Actuation Apparatus>

Figure 15:
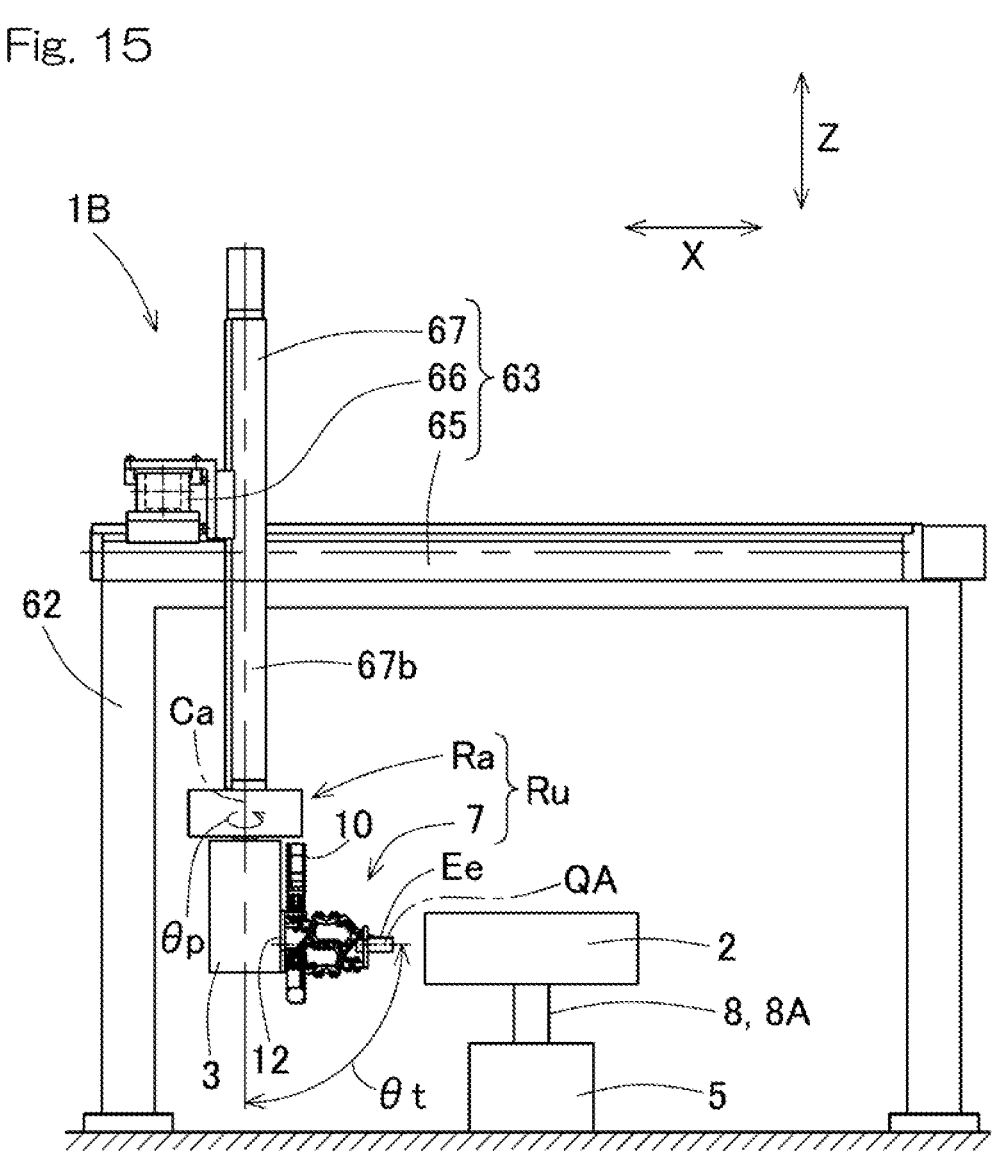
FIG. 15 shows a front elevational view of an operation device, in accordance with a second embodiment of the present invention.

FIG. 15: the bend angle θ=0°; the traverse angle □=0°; and the rotational angle θp=0°.

Figure 16:
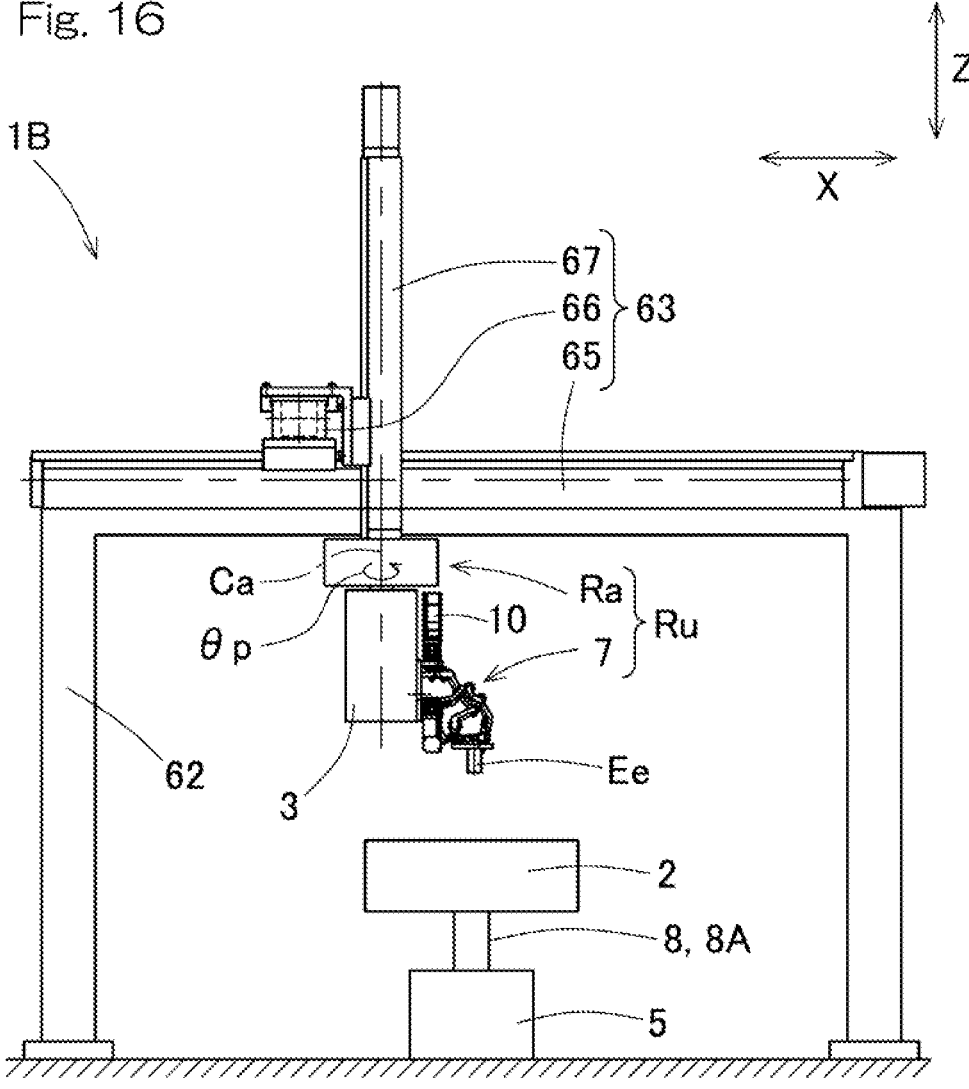
FIG. 16 shows a front elevational view of the operation device illustrating how an operation may be performed on the top surface of a workpiece.

FIG. 16: the bend angle θ=90°; the traverse angle □=0°; and the rotational angle θp=0°.

Figure 17:
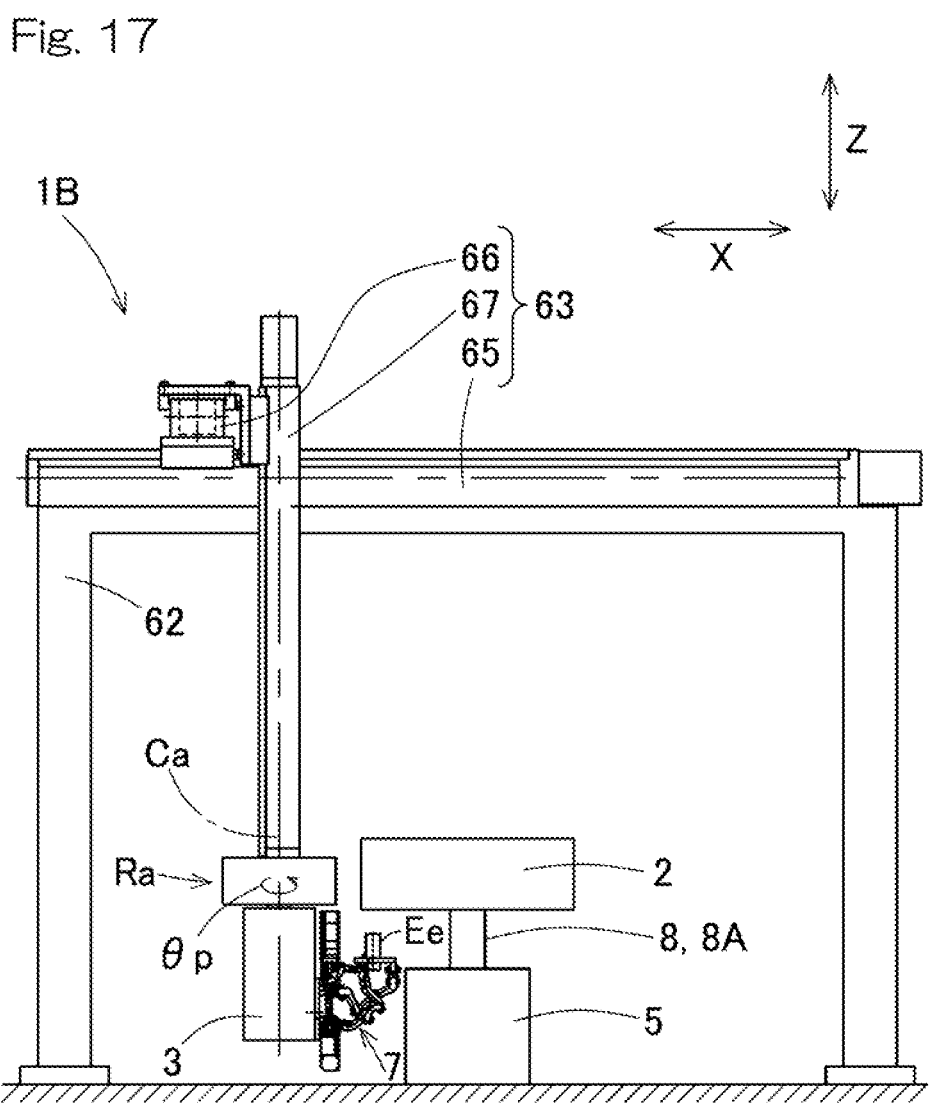
FIG. 17 shows a front elevational view of the operation device illustrating how an operation may be performed on the bottom surface of the workpiece.

FIG. 17: the bend angle θ=90°; the traverse angle □=180°; and the rotational angle θp=0°.

Figure 18:
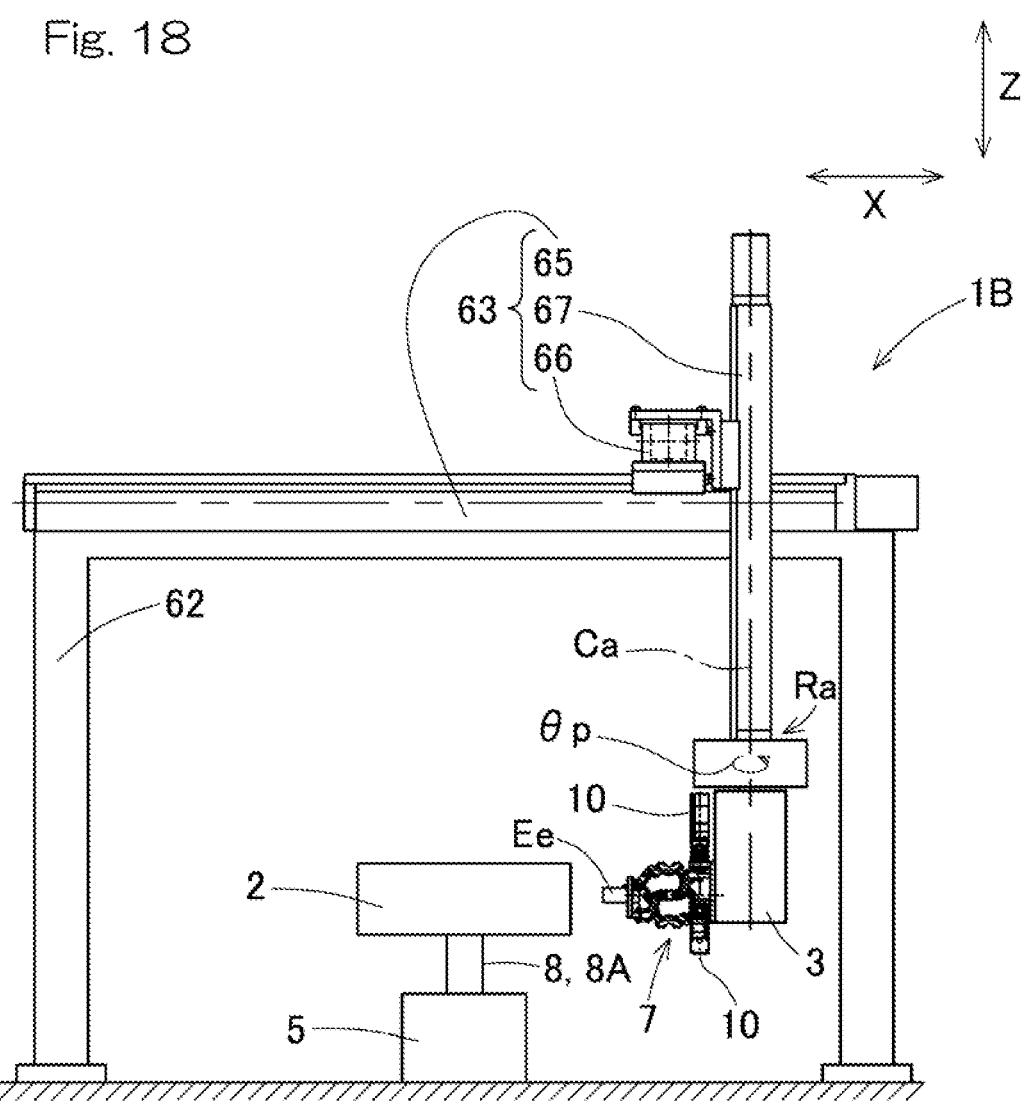
FIG. 18 shows a front elevational view of the operation device illustrating how an operation may be performed on the right lateral surface of the workpiece.

FIG. 18: the bend angle θ=0°; the traverse angle □=0°; and the rotational angle θp=180°.

According to the second embodiment, a link actuation apparatus 7 with a maximum bend angle θmax of no less than 90° is used and disposed such that the central axis QA of the proximal end side-link hub 12 is perpendicular to the axis Ca of rotation of the rotation actuator Ra. In this way, the end effector Ee can approach different surfaces of a workpiece 2 in directions normal thereto to perform an operation thereon. The remaining features are equivalent to those in the aforementioned first embodiment and produce the same benefits and functions as those of the first embodiment.

Third Embodiment: Operation Device 1C

Figure 19:
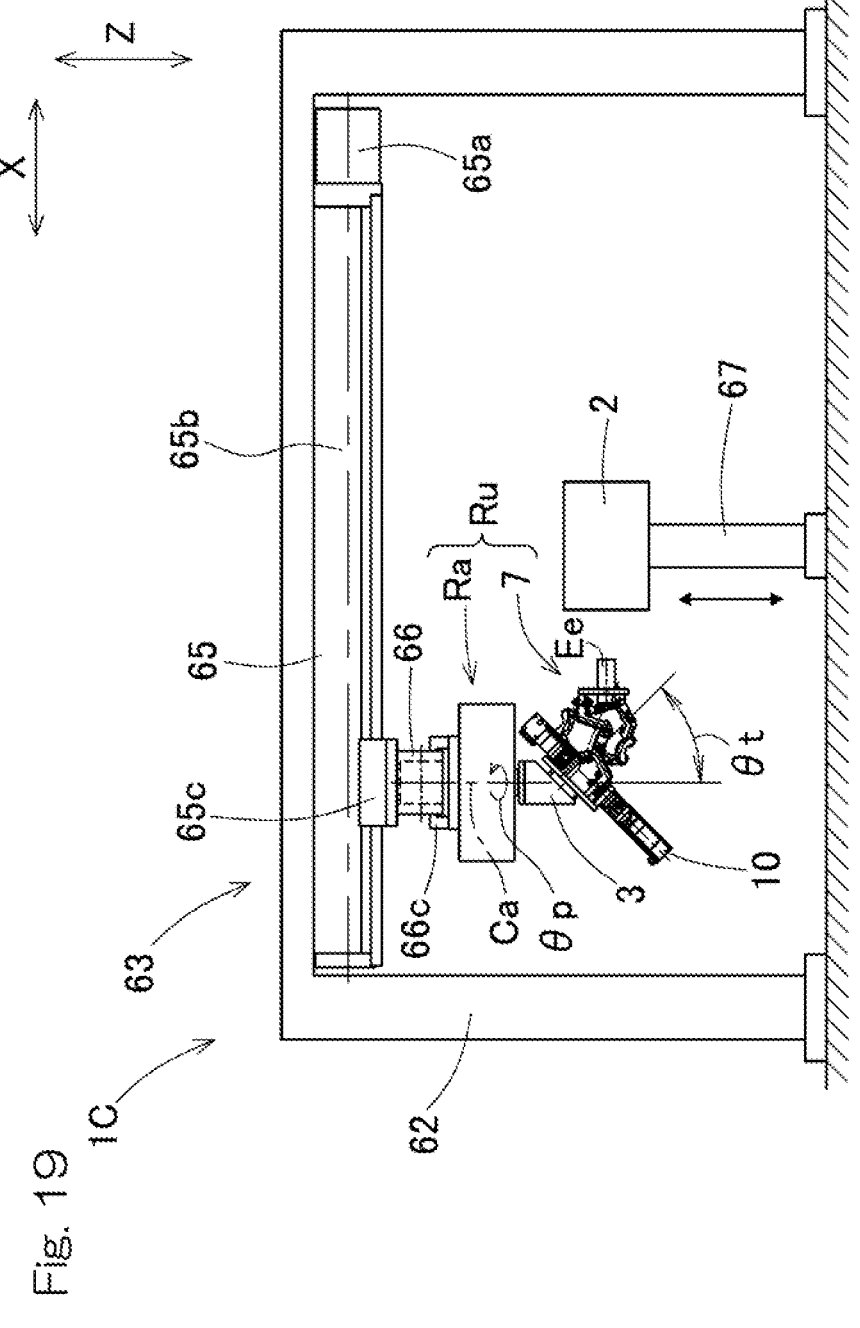
FIG. 19 shows a front elevational view of an operation device, in accordance with a third embodiment of the present invention.

As illustrated in FIG. 19, the third linear actuator 67 which advances and retracts in directions along the Z-axis may be disposed on the side of a workpiece 2. In a third embodiment, the rotation actuator Ra is mounted to the slide table 66c of the second linear actuator 66. The axis Ca of rotation of this rotation actuator Ra is parallel to the direction of advance and retraction (i.e., a vertical direction) of the third linear actuator 67, just as in the aforementioned first and second embodiments. In this instance, reduced weight of an assembly of the rotation unit Ru and a linear actuator (i.e., the second linear actuator 66 in this example) that supports this rotation unit Ru is achieved, allowing for a high-speed operation for the operation device as a whole to be implemented. Also, the range of movement of the linear motion unit 63 can be shrunk in size, thereby making it easier for a more compact design of the operation device as a whole to be realized.

Fourth Embodiment: Operation Device 1D

Figure 20:
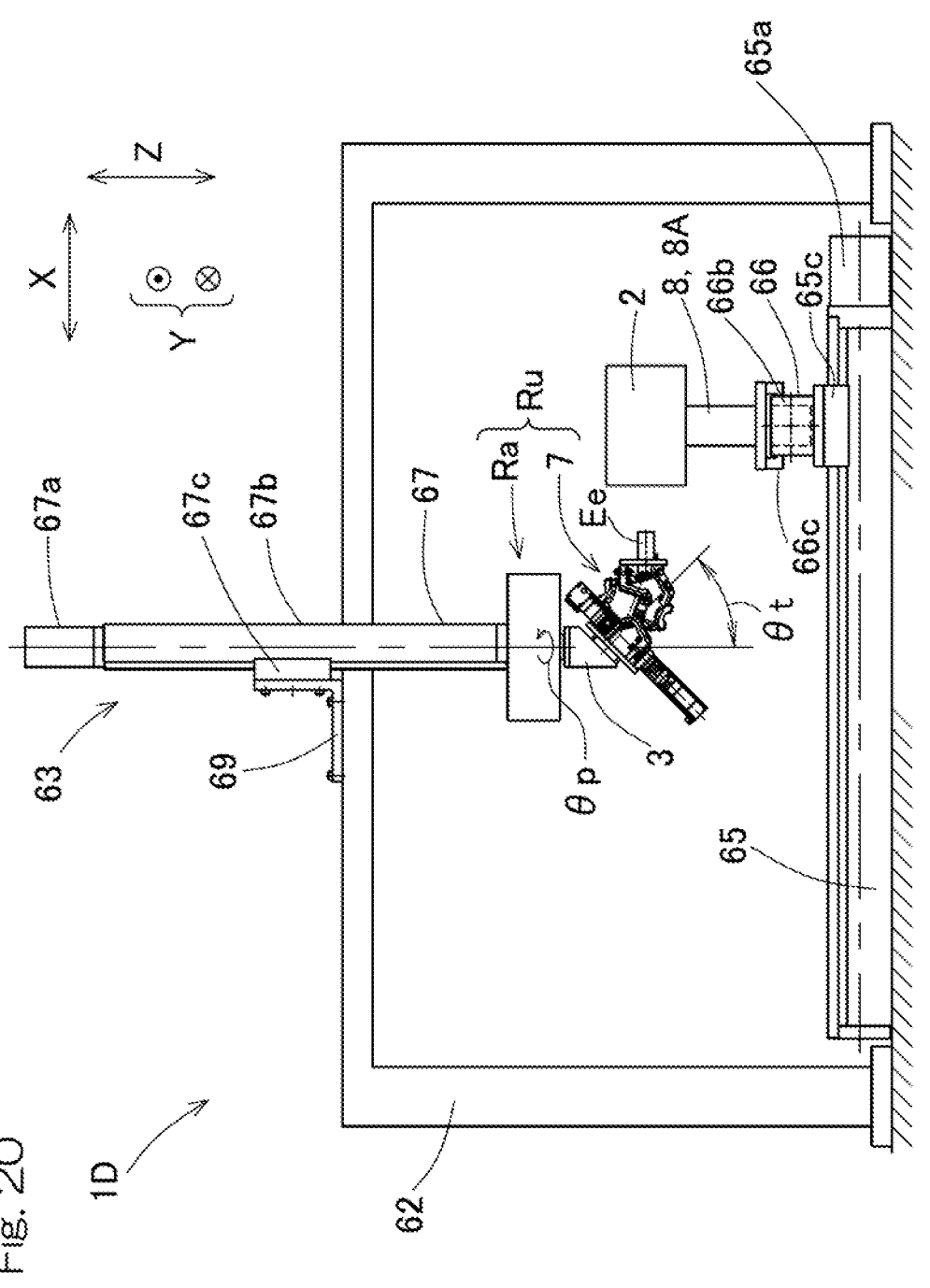
FIG. 20 shows a front elevational view of an operation device, in accordance with a fourth embodiment of the present invention.

As illustrated in FIG. 20, the first and second linear actuators 65, 66 that advance and retract in directions along the X-axis and the Y-axis, respectively, may be disposed on the side of a workpiece 2. In this example, the first linear actuator 65 is installed on the ground (or a floor) such that the guide 66b of the second linear actuator 66 is fixed to the slide table 65c of the first linear actuator 65 by means of the coupling and fixing member 68. The workpiece 2 is placed on the workpiece mount table 8 or the workpiece lifter device 8A, through which it is arranged on the slide table 66c that is driven to advance and retract along this guide 66b. The third linear actuator 67 which advances and retracts in directions along the Z-axis is mounted to the frame 62 by means of the coupling and fixing member 69. In this instance, reduced weight of an assembly of the rotation unit Ru and a linear actuator (i.e., the third linear actuator 67 in this example) that supports this rotation unit Ru is achieved, allowing for a high-speed operation for the operation device as a whole to be implemented.

Fifth Embodiment: Operation Device 1E

Figure 21:
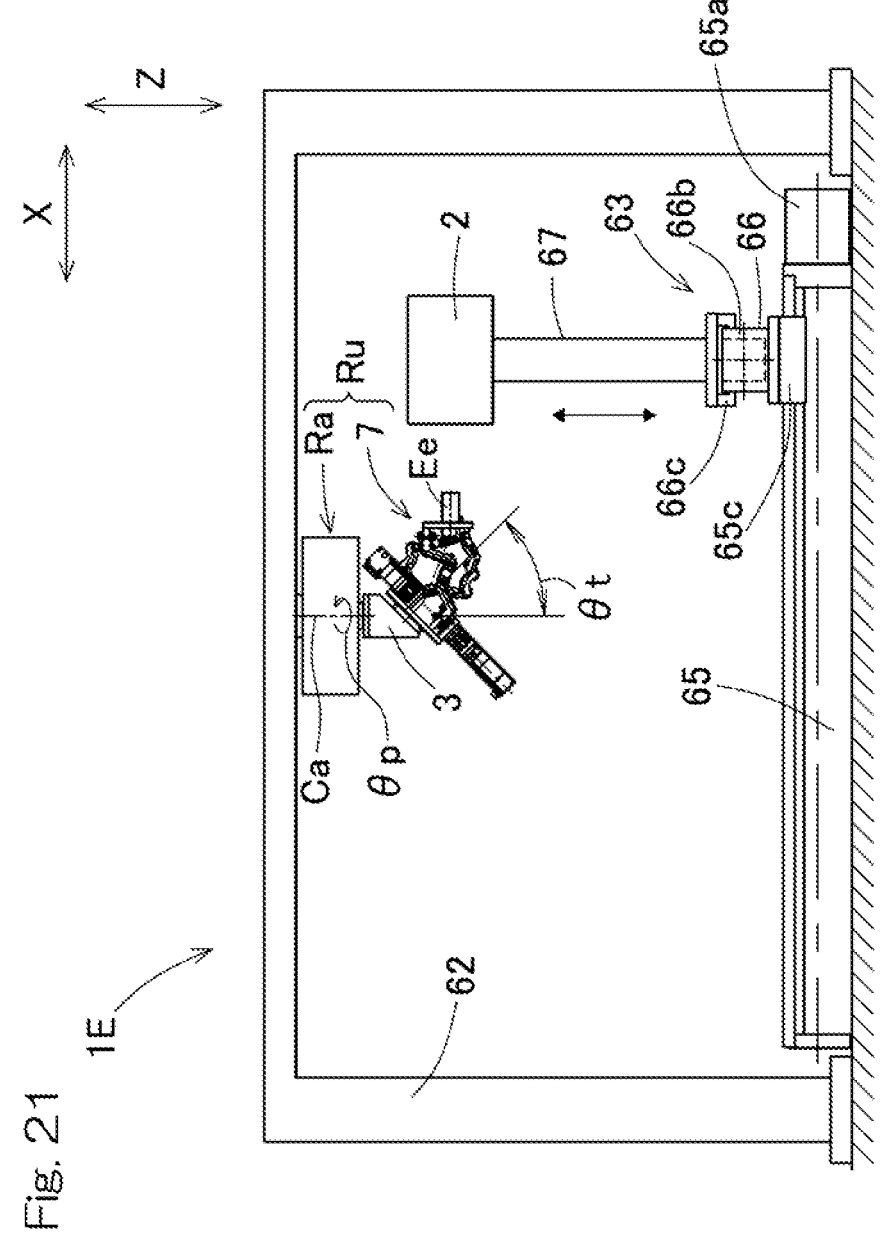
FIG. 21 shows a front elevational view of an operation device, in accordance with a fifth embodiment of the present invention.

As illustrated in FIG. 21, the rotation actuator Ra may be mounted to the frame 62, while the linear motion unit 63 is disposed on the side of a workpiece 2. In this instance, the rotation unit Ru and the linear motion unit 63 can be independently supported, thereby allowing for a high-speed operation of the operation device as a whole to be implemented.

The present invention is not limited to the foregoing embodiments, and various additions, changes, or omissions can be made therein without departing from the principle of the present invention. For example, while a speed reducer-equipped motor is employed as the rotation actuator in the above-described embodiments, it may instead be a motor of some other design such as a servo motor of a direct drive design or with no speed reducer. Also, the cover disposed around the rotation actuator may be a stationary cover secured to a stationary part of the rotation actuator, etc., and the cable carrier may be positioned inside this cover. Further, the cable carrier may simply be disposed around the rotation actuator so as to slide in a direction of rotation without any cover. Accordingly, such variants are also encompassed within the scope of the present invention.

REFERENCE SYMBOLS 1B, 1C, 1D, 1E • • • operation device
1A • • • appearance inspection device
7 • • • link actuation apparatus
10 • • • attitude control actuator
12 • • • proximal end side-link hub
13 • • • distal end side-link hub
14 • • • link mechanism
15 • • • proximal end side-end link member
16 • • • distal end side-end link member
17 • • • intermediate link member
18 • • • actuator main component
19 • • • speed reducer
44 • • • cable carrier 62 • • • frame
63 • • • linear motion unit
65, 66, 67 • • • first, second, and third linear actuators
65*b* • • • guide (first slid-upon component)
65*c* • • • slide table (first slider component)
66*b* • • • guide (second slid-upon component)
66*c* • • • slide table (second slider component)
67*b* • • • guide (third slider component)
67*c* • • • slide table (third slid-upon component)
Cb • • • cables
Eg • • • imaging instrument
Ra • • • rotation actuator
Ru • • • rotation unit

What is claimed is:

1. An operation device comprising:

a combination of a rotation unit and a linear motion unit, the rotation unit including a link actuation apparatus and a rotation actuator, the link actuation apparatus including a proximal end side-link hub, and a distal end side-link hub, three or more link mechanisms which couple the distal end side-link hub to the proximal end side-link hub so as to enable a varying attitude of the distal end side-link hub relative to the proximal end side-link hub, each of the three or more link mechanisms including: a proximal end side-end link member having one end pivotably coupled to the proximal end side-link hub; a distal end side-end link member having one end pivotably coupled to the distal end side-link hub; and an intermediate link member having opposite ends pivotably coupled to the other ends of the the proximal end side-end link member and the distal end side-end link member, at least two of the three or more link mechanisms being associated with attitude control actuators configured to vary the attitude of the distal end side-link hub such that the distal end side-link hub assumes a given attitude relative to the proximal end side-link hub, the link actuation apparatus being mounted to an output shaft of the rotation actuator via a mounting member such that a central axis of the proximal end side-link hub forms an angle θt inclined relative to an axis of rotation of the rotation actuator, a central axis of the output shaft of the rotation actuator coinciding with the axis of rotation of the rotation actuator, the linear motion unit including a linear actuator serving as an output portion thereof, and the rotation unit being mounted to this linear actuator, wherein the mounting member has a tip end provided with a slope surface which is inclined by a predetermined angle relative to the axis of rotation of the rotation actuator, and the proximal end side-link hub is secured to the slope surface.

2. The operation device as claimed in claim 1, wherein: two or more of the attitude control actuators in the link actuation apparatus are disposed such that rotary shafts for the attitude control actuators extend perpendicular to said central axis of the proximal end side-link hub; the rotary shafts for the two or more of the attitude control actuators define an intersecting point on said central axis of the proximal end side-link hub forming said angle θt; for two of the two or more of the attitude control actuators, bisectors of the rotary shafts meet a plane defined by said axis of rotation of the rotation actuator and said central axis of the proximal end side-link hub; and the bisectors are situated on a side of an acute angle formed between said axis of rotation of the rotation actuator and said central axis of the proximal end side-link hub.

3. The operation device as claimed in claim 1, wherein: the rotation actuator includes a rotation control actuator main component and a speed reducer configured to reduce speed of rotation from this actuator main component; and a cable carrier configured to guide at least cables extending from the attitude control actuators while protecting the same is disposed around the rotation actuator so as to slide in a direction of rotation.

4. The operation device as claimed in claim 1, wherein the linear motion unit includes a first linear actuator mounted to a frame, a second linear actuator, and a third linear actuator which is said linear actuator serving as said output portion of the linear motion unit, and the rotation unit is mounted to this third linear actuator.

5. The operation device as claimed in claim 4, wherein the linear motion unit includes:

the first linear actuator including a first slid-upon component mounted to the frame and a first slider component configured to be driven to advance and retract along this first slid-upon component;

the second linear actuator including a second slid-upon component coupled to the first slider component and a second slider component configured to be driven to advance and retract along this second slid-upon component; and the third linear actuator including a third slid-upon component coupled to the second slider component and a third slider component configured to be driven to advance and retract along this third slid-upon component.

6. The operation device as claimed in claim 5, wherein: the first linear actuator and the second linear actuator are arranged such that directions of advance and retraction of the first slider component and the second slider component are perpendicular to each other, and the third linear actuator is arranged such that a direction of advance and retraction of the third slider component is perpendicular to the directions of advance and retraction of the first slider component and the second slider component.

7. The operation device as claimed in claim 5, wherein: the third linear actuator is arranged such that a direction of advance and retraction of the third slider component is a vertical direction;

the third slider component is a guide of the linear actuator; and the third slid-upon component is a slide table of the linear actuator.

8. The operation device as claimed in claim 5, wherein the rotation actuator is arranged such that said axis of rotation thereof is parallel to a direction of advance and retraction of the third slider component.

9. The operation device as claimed in claim 1, wherein the link actuation apparatus has a maximum bend angle of no less than 90° between said central axis of the proximal end side-link hub and a central axis of the distal end side-link hub.

10. The operation device as claimed in claim 9, wherein the link actuation apparatus is mounted such that said central axis of the proximal end side-link hub is perpendicular to said axis of rotation of the rotation actuator.

11. The operation device as claimed in claim 1, wherein this operation device is an appearance inspection device with an imaging instrument installed to the link actuation apparatus.

\*   \*   \*   \*   \*